US011485292B2

(12) United States Patent
Vanderpool et al.

(10) Patent No.: US 11,485,292 B2
(45) Date of Patent: Nov. 1, 2022

(54) STORAGE FOR SEATING ASSEMBLY

(71) Applicant: Ford Global Technologies, LLC, Dearborn, MI (US)

(72) Inventors: Patrick Vanderpool, Southfield, MI (US); Dustin Shedlarski, Commerce Township, MI (US); Victoria Leigh Schein, Dearborn, MI (US); Timothy Owen Hamlin, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/223,107

(22) Filed: Apr. 6, 2021

(65) Prior Publication Data
US 2021/0221295 A1 Jul. 22, 2021

Related U.S. Application Data

(62) Division of application No. 16/832,401, filed on Mar. 27, 2020, now Pat. No. 11,007,945, which is a division of application No. 16/542,941, filed on Aug. 16, 2019, now Pat. No. 10,640,048, which is a division of application No. 15/869,425, filed on Jan. 12, 2018, now Pat. No. 10,427,611.

(51) Int. Cl.
*B60R 7/04* (2006.01)
*B60N 3/00* (2006.01)

(52) U.S. Cl.
CPC .............. *B60R 7/043* (2013.01); *B60N 3/004* (2013.01)

(58) Field of Classification Search
CPC .................................. B60R 7/043; B60N 3/004
USPC .......................................................... 297/163
See application file for complete search history.

(56) References Cited

U.S. PATENT DOCUMENTS

| | | | | |
|---|---|---|---|---|
| 3,924,893 A | * | 12/1975 | Ferrara | B60N 2/686 297/452.47 |
| 4,650,103 A | | 3/1987 | Mitchell | |
| 5,314,232 A | | 5/1994 | Hopkins | |
| 5,415,457 A | | 5/1995 | Kifer | |
| 5,628,543 A | * | 5/1997 | Filipovich | B60R 5/006 297/188.14 |
| 5,863,092 A | | 1/1999 | Kifer | |
| 5,915,777 A | | 6/1999 | Gignac | |
| 6,131,993 A | | 10/2000 | Pesta | |
| 6,142,561 A | | 11/2000 | Pesta | |
| 6,199,948 B1 | * | 3/2001 | Bush | B60N 2/206 297/440.14 |
| 6,203,104 B1 | | 3/2001 | Matsuo et al. | |
| 6,789,714 B1 | | 9/2004 | Benson | |
| 7,000,810 B1 | | 2/2006 | Farmer | |
| 7,020,897 B2 | | 4/2006 | Johnson | |
| 7,084,932 B1 | * | 8/2006 | Mathias | B60R 11/0235 348/839 |
| D562,576 S | * | 2/2008 | Ritzel | D6/356 |
| 8,118,201 B1 | | 2/2012 | Calkin | |

(Continued)

*Primary Examiner* — Mark R Wendell
(74) *Attorney, Agent, or Firm* — Vichit Chea; Price Heneveld LLP

(57) ABSTRACT

A vehicle seating assembly includes a seatback. The seatback includes a rear portion and a substantially horizontal strap including first and second ends fixed to the rear portion. The substantially horizontal strap further includes an intermediate attachment area fixed to the rear portion between the first and second ends.

17 Claims, 20 Drawing Sheets

(56) References Cited

U.S. PATENT DOCUMENTS

| | | | |
|---|---|---|---|
| 8,141,948 B2* | 3/2012 | Cassellia | B60K 35/00 |
| | | | 297/217.3 |
| 8,627,514 B1 | 1/2014 | Scoggins et al. | |
| 10,144,315 B2 | 12/2018 | Michalak et al. | |
| 10,589,688 B2 | 3/2020 | Diaz Paredes | |
| 10,960,794 B1* | 3/2021 | Booth | B60N 2/5664 |
| 2003/0201292 A1* | 10/2003 | Lovett | A45C 15/00 |
| | | | 224/427 |
| 2005/0110310 A1* | 5/2005 | Mayer | B60R 11/02 |
| | | | 297/188.06 |
| 2005/0248189 A1 | 11/2005 | Prasatek et al. | |
| 2007/0138855 A1* | 6/2007 | Kespohl | B60N 2/686 |
| | | | 297/452.18 |
| 2007/0289045 A1 | 12/2007 | Evans et al. | |
| 2008/0179924 A1 | 7/2008 | Thompson et al. | |
| 2008/0238169 A1* | 10/2008 | Hicks | B60N 3/08 |
| | | | 297/353 |
| 2008/0272630 A1 | 11/2008 | Sturt et al. | |
| 2009/0014602 A1 | 1/2009 | Frost | |
| 2010/0007175 A1 | 1/2010 | Mayer | |
| 2010/0107861 A1 | 5/2010 | Carter | |
| 2010/0282809 A1* | 11/2010 | Scicluna | A45F 3/047 |
| | | | 224/653 |
| 2011/0278339 A1 | 11/2011 | Hexels | |
| 2013/0068919 A1 | 3/2013 | Antonioni | |
| 2013/0193179 A1 | 8/2013 | Davidson | |
| 2017/0291710 A1 | 10/2017 | Barr-Perea et al. | |
| 2018/0222400 A1 | 8/2018 | Neumann et al. | |
| 2018/0279786 A1 | 10/2018 | Barile | |
| 2019/0077330 A1 | 3/2019 | Michalak et al. | |

* cited by examiner

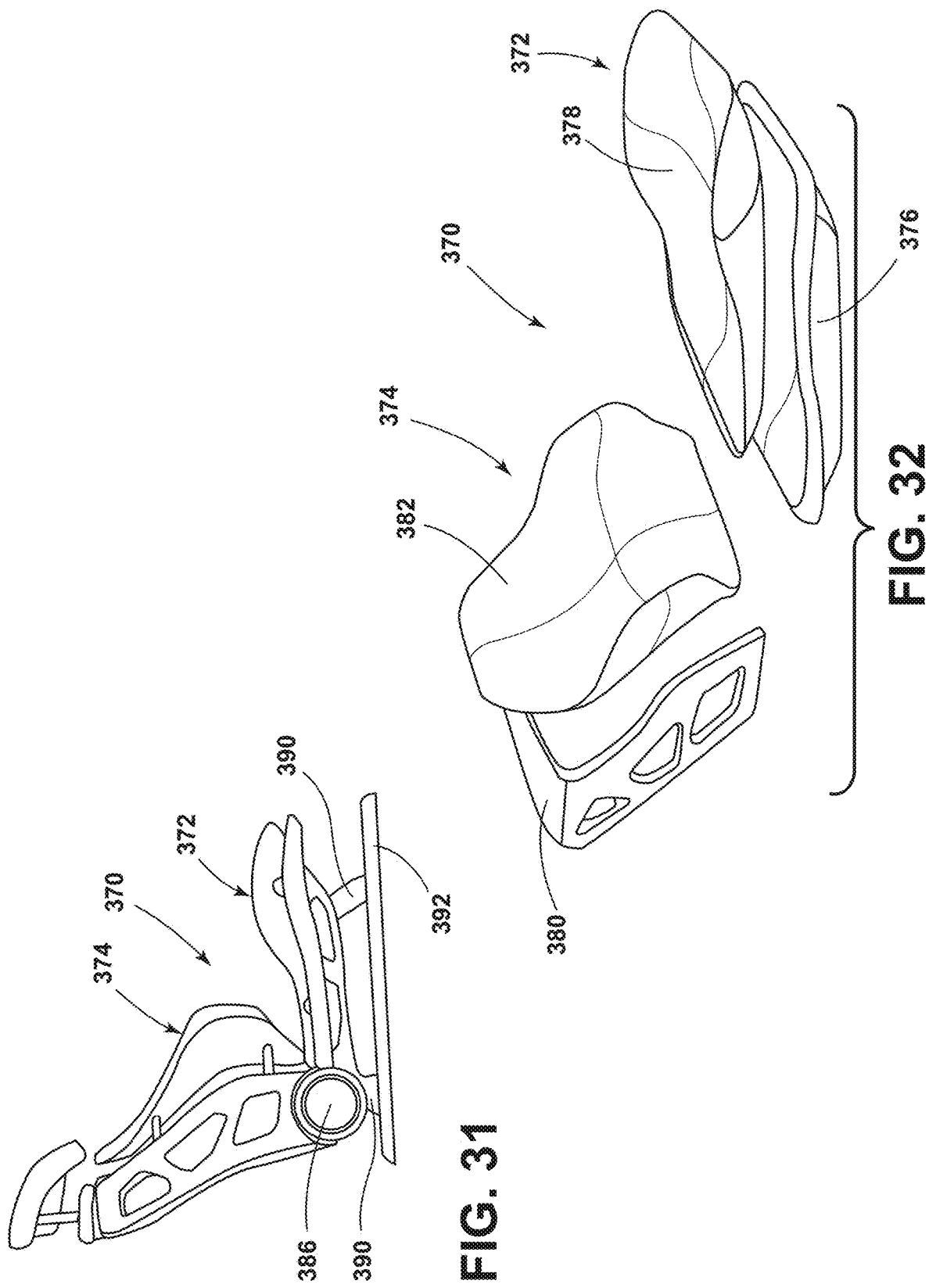

US 11,485,292 B2

STORAGE FOR SEATING ASSEMBLY

CROSS-REFERENCE TO RELATED APPLICATIONS

The present application is a divisional of U.S. patent application Ser. No. 16/832,401, filed Mar. 27, 2020, now U.S. Pat. No. 11,007,945, entitled "STORAGE FOR SEATING ASSEMBLY," which is a divisional of U.S. patent application Ser. No. 16/542,941, filed Aug. 16, 2019, now U.S. Pat. No. 10,640,048, entitled "STORAGE FOR SEATING ASSEMBLY," which is a divisional of U.S. patent application Ser. No. 15/869,425, filed Jan. 12, 2018, now U.S. Pat. No. 10,427,611, entitled "STORAGE FOR SEATING ASSEMBLY," the entire disclosures of which are hereby incorporated herein by reference in their entireties.

FIELD OF THE DISCLOSURE

The present disclosure generally relates to vehicle seating assemblies, and more particularly to storage areas for vehicle seating assemblies.

BACKGROUND OF THE DISCLOSURE

Seating assemblies typically include a seatback to support a back of an occupant in an upright sitting position and various reclined positions. Similar to other areas of a vehicle interior, such as consoles and door trim panels, seatbacks commonly include storage areas for passenger items. However, improved seatback storage areas for passenger items are always desired.

SUMMARY OF THE DISCLOSURE

According to a first aspect of the present disclosure, a vehicle seating assembly includes a seatback. The seatback includes a rear portion and a substantially horizontal strap including first and second ends fixed to the rear portion. The substantially horizontal strap further includes an intermediate attachment area fixed to the rear portion between the first and second ends.

Embodiments of the first aspect of the disclosure can include any one or a combination of the following features:
 the substantially horizontal strap comprises a plurality of substantially horizontal straps having first and second ends and intermediate attachment areas fixed to the rear portion between the first and second ends;
 the intermediate attachment areas are arranged in a plurality of substantially vertical columns and the plurality of substantially vertical columns are transverse to the plurality of substantially horizontal straps;
 the intermediate attachment area is sewn to the rear portion;
 the intermediate attachment area is heat staked to the rear portion; and/or
 the rear portion comprises a substrate covered with a trim.

According to a second aspect of the present disclosure, a seating assembly includes a seat and a seatback. A rear portion of the seatback includes a panel with an elongated member for retaining a passenger item. The elongated member includes an exposed portion configured to retain the passenger item and a concealed portion within the panel.

Embodiments of the second aspect of the disclosure can include any one or a combination of the following features:
 the panel comprises a first part and a second part, wherein the concealed portion of the elongated member is retained between the first part and the second part, wherein the second part is fixed to the first part, and wherein the second part includes an opening that provides access to the exposed portion of the elongated member;
 the elongated member is fixed to the first part of the panel;
 the elongated member is fixed to the second part of the panel;
 the panel is an interchangeable modular member of the seatback; and/or
 the panel is fixed to a seatback frame.

According to a third aspect of the present disclosure, a vehicle seating assembly includes a seatback. The seatback includes a rear portion. The rear portion includes first and second substantially parallel channels. The seatback also includes a strap including a loop for retaining a passenger item. The loop includes a first end and a second end. The first end and the second end are slidably mounted in the first and the second substantially parallel channels.

Embodiments of the third aspect of the disclosure can include any one or a combination of the following features:
 the loop is selectively positionable and fixable at a plurality of locations along the first and the second substantially parallel channels;
 the loop is selectively positionable in a vertical direction toward or away from a headrest;
 the strap comprises a plurality of loops and wherein the first ends and the second ends of the plurality of loops are slidably mounted in a plurality of first and second substantially parallel channels;
 the strap comprises a plurality of straps and wherein the plurality of straps are selectively arrangeable in various positions along the plurality of first and second substantially parallel channels;
 the rear portion comprises a panel;
 the panel is selectively removable from the seatback; and/or
 the panel is a table.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 31 is a side elevational view of a seating assembly with shell and liner portions, according to a further embodiment; and FIG. 32 is an exploded side perspective view of portions of the seating assembly with shell and liner portions of FIG. 31.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
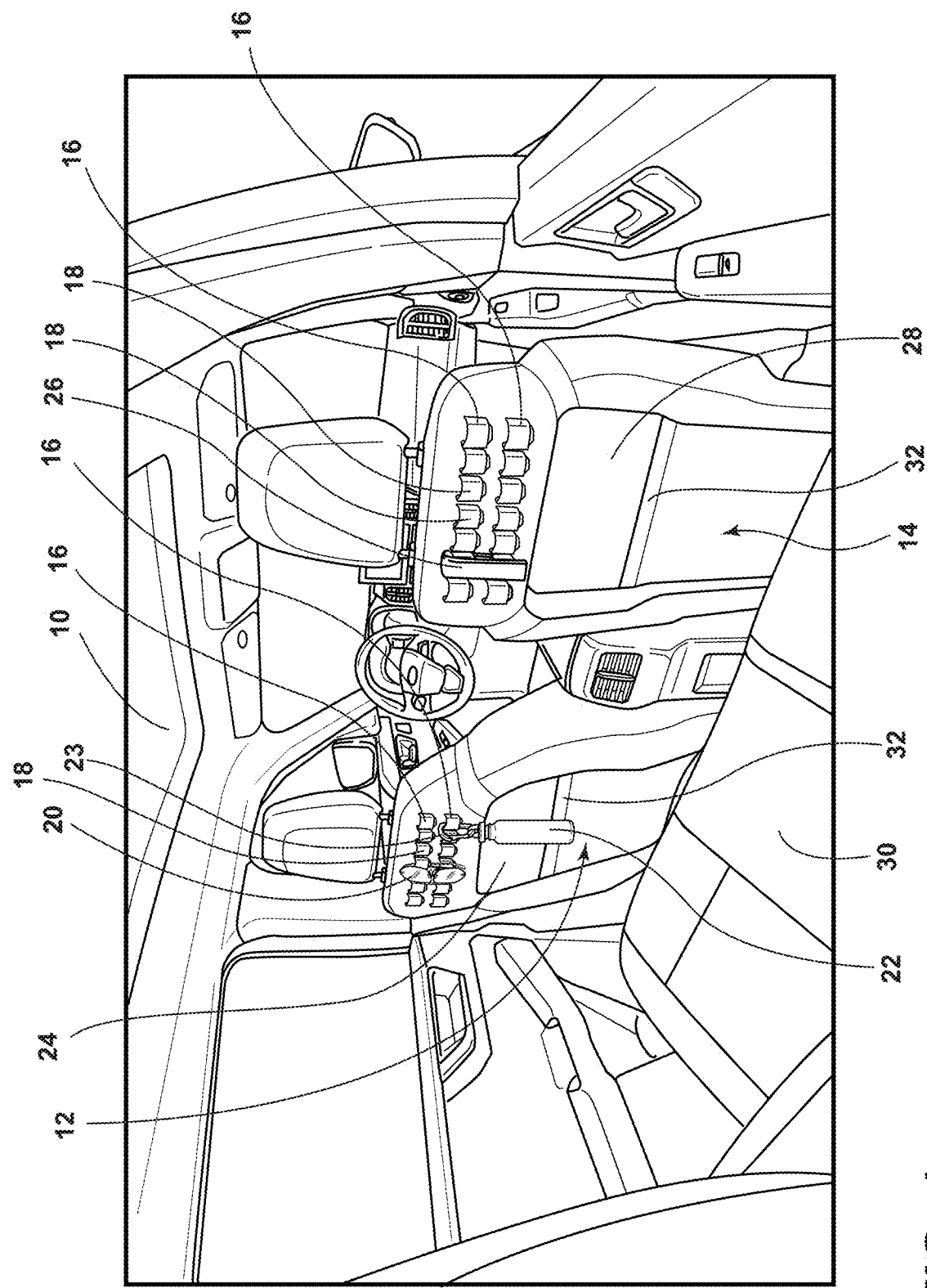
FIG. 1 is a back perspective view of seatbacks with loops for retaining passenger items in a vehicle interior, according to one embodiment.

Referring to FIG. 1, a vehicle interior 10 is illustrated having a driver side seating assembly 12 and a passenger side seating assembly 14 each equipped on the seatbacks with straps 16 containing loops 18 for supporting one or more passenger items. In the depicted example, passenger items include sunglasses 20 and a water bottle 22 attached to carrabeaner 23 on the driver side seatback 24 and storage container 26 on the passenger side seatback 28. In addition to the sunglasses 20, water bottle 22, and storage container 26, a variety of additional passenger items, such as snacks, dog leashes, ice scrapers, and other items typically transported in vehicles can be stored on the straps 16. Passenger items may be hung within the straps 16 (for example sunglasses 20 and storage container 26) or suspended from the straps (for example carrabeaner 23 with water bottle 22). It is desirable to have a variety of easily accessible, visible storage areas on the driver side seatback 24 and the passenger side seatback 28. Passengers seated in the driver side seating assembly 12 are able to see items stored on the passenger side seatback 28. Passengers seated in the passenger side seating assembly 14 are able to see items stored on the driver side seatback 24. Pockets 32 on driver side seatback 24 and passenger side seatback 28 provide additional space for passenger items.

Figure 2:
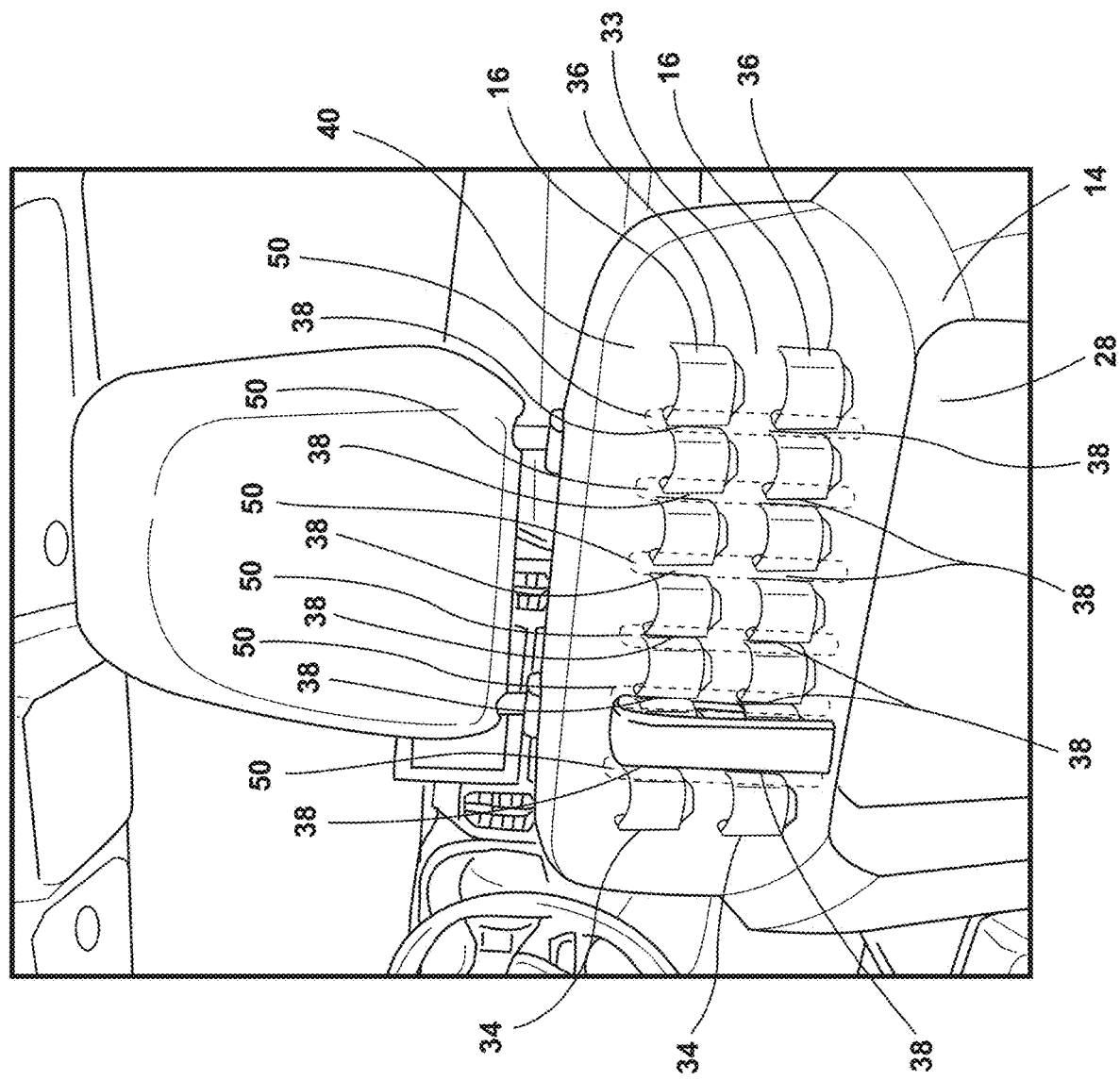
FIG. 2 is an enlarged view of the passenger side seatback with loops for retaining passenger items of FIG. 1.
Figure 3:
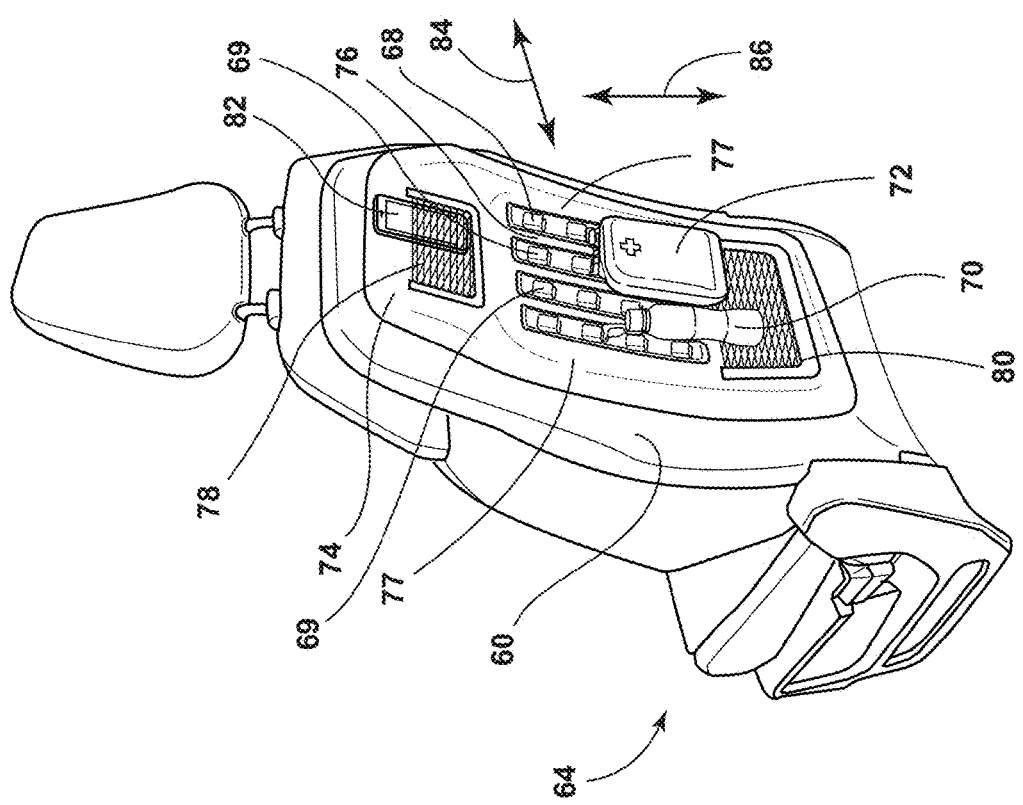
FIG. 3 is a back perspective view of a seatback with loops for retaining passenger items, according to another embodiment.

Referring to FIGS. 1-2, the passenger side seatback 28 includes a rear portion 32 with two substantially horizontal straps 16. Each substantially horizontal strap 16 includes a first end 34 and a second end 36, both of which are fixed to the rear portion 33. Intermediate attachment areas 38 are fixed to the upper rear portion 33 between the first ends 34 and the second ends 36 of straps 16. In various aspects, the straps 16 are sewn to the rear portion 32 at the intermediate attachment areas 38 and the first and second ends 34 and 36 of the straps 16. In the depicted embodiment of FIG. 2, the intermediate attachment areas 38 are arranged in substantially vertical columns 50, and the substantially vertical columns 50 are substantially transverse to the horizontal straps 16. In various embodiments, the straps 16 may be heat staked to the rear portion 32 at intermediate attachment areas 38, first end 34, and second end 36. In various embodiments, the straps 16 may be canvas, nylon, plastic or another material. Seat trim 40 covers the underlying substrate of the upper rear portion 33 of the passenger side seatback 28. In various embodiments, the seat trim 40 may be leather, vinyl, cloth, plastic, or another material.

Figure 8:
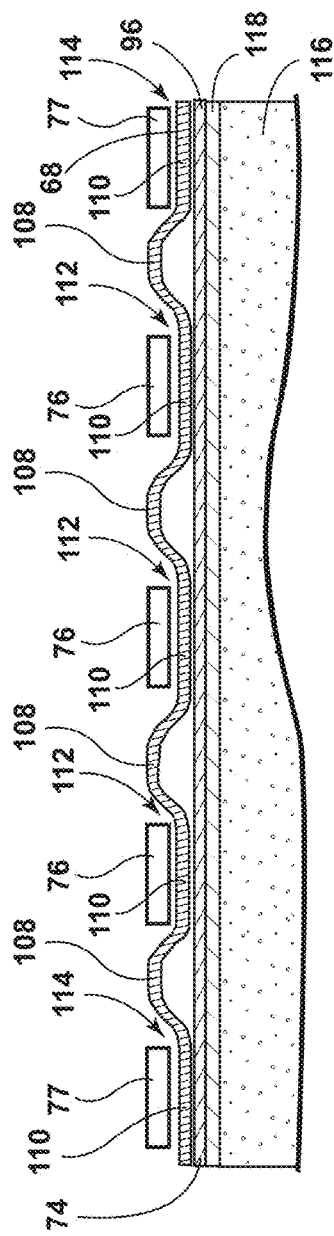
FIG. 8 is a cross-sectional view of the seatback of FIG. 7 taken along line VIII-VIII of FIG. 7.
Figure 9:
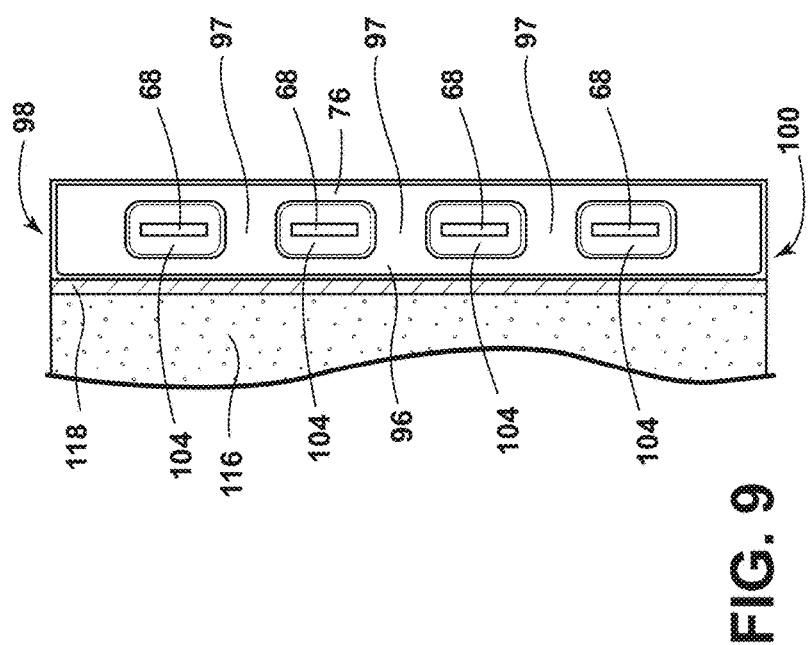
FIG. 9 is a cross-sectional view of the seatback of FIG. 7 taken along line IX-IX of FIG. 7.

Referring to FIGS. 3-9, a seating assembly 64 is illustrated having a seatback 60 and a panel 74 attached to seatback 60. Panel 74 includes elongated members (straps 68 in the depicted embodiment) that form loops 69 for retaining passenger items (e.g., water bottle 70 and first aid kit 72). The straps 68 are mounted on panel 74. The panel 74 includes integral cross members 76 and outer members 77 for securing the elongated members 68 within the panel 74. Openings (channels 79) are located between adjacent cross members 76 and outer members 77. Channels 79 are vertically elongated and provide a vehicle occupant access to straps 68. An upper storage pocket 78 and a lower storage pocket 80 are located above and below, respectively, the straps 68. The upper storage pocket 78 is formed of an elastic mesh or netting and contains a passenger item that is shown in one example as a telephone 82. The seating assembly 64 includes the straps 68 arranged in a substantially horizontal position along axis 84. The cross members 76 are arranged in a substantially vertical position along axis 86. In an alternate embodiment, the straps 68 are arranged in a substantially vertical position along axis 86, and the cross members 76 are arranged in a substantially horizontal position along axis 84. With reference to FIGS. 4A and 7-9, the panel 74 includes a base 96 beneath cross members 76 and elongated members 68. Cross members 76 include first end 98, second end 100, and connection areas 97. In the depicted embodiment of FIGS. 7-9, the substantially horizontal straps 68 extend through holes 104 in the cross members 76. In various embodiments, elongated members 68 are inserted through holes 104 in the cross members 76 so that elongated members 68 are arranged horizontally across seatback 60. After straps 68 are arranged within panel 74, straps 68 have exposed portions 108 and concealed portions 110, as shown in FIG. 8. Exposed portions 108 are visible to vehicle occupants. Concealed portions 110 are behind cross members 76 or outer members 77 and are not visible to vehicle occupants. In various embodiments, the elongated members 68 may be secured to the base 96 at intermediate attachments 112 (below cross members 76) and 114 (below outer members 77). In various embodiments, straps 68 may be made of a nylon material that is heat staked to a polymeric base 96 at attachment areas 112 and 114.

Figure 4A:
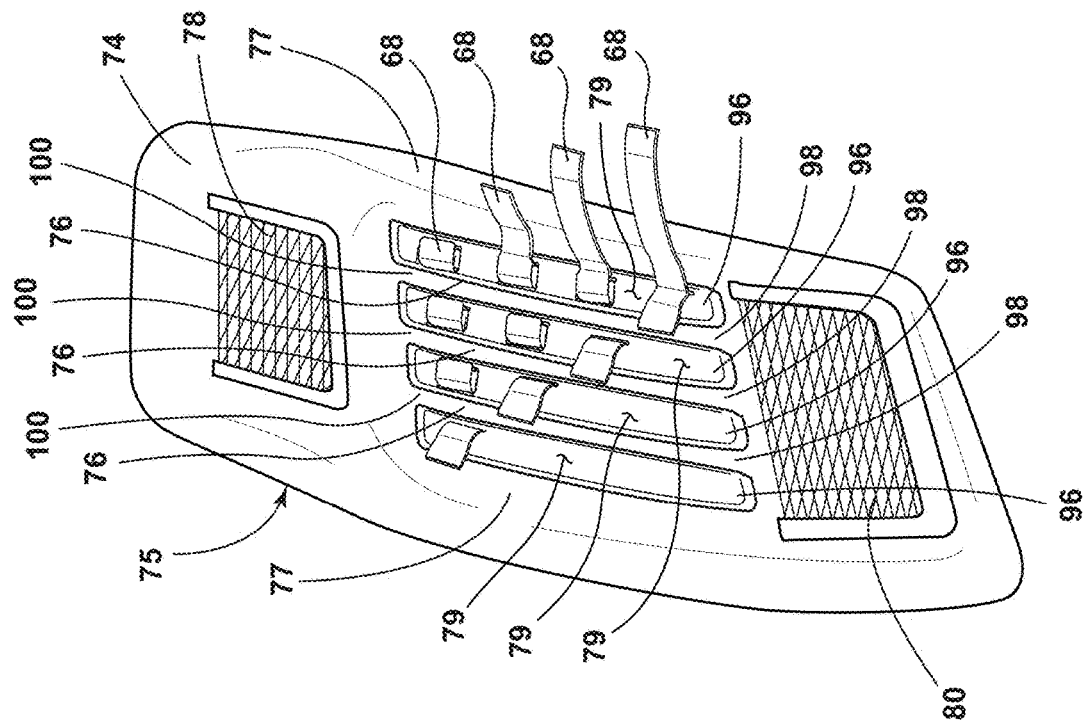
FIG. 4A is an enlarged back perspective view of a panel of the seatback of FIG. 3 with straps in various stages of assembly.
Figure 4B:
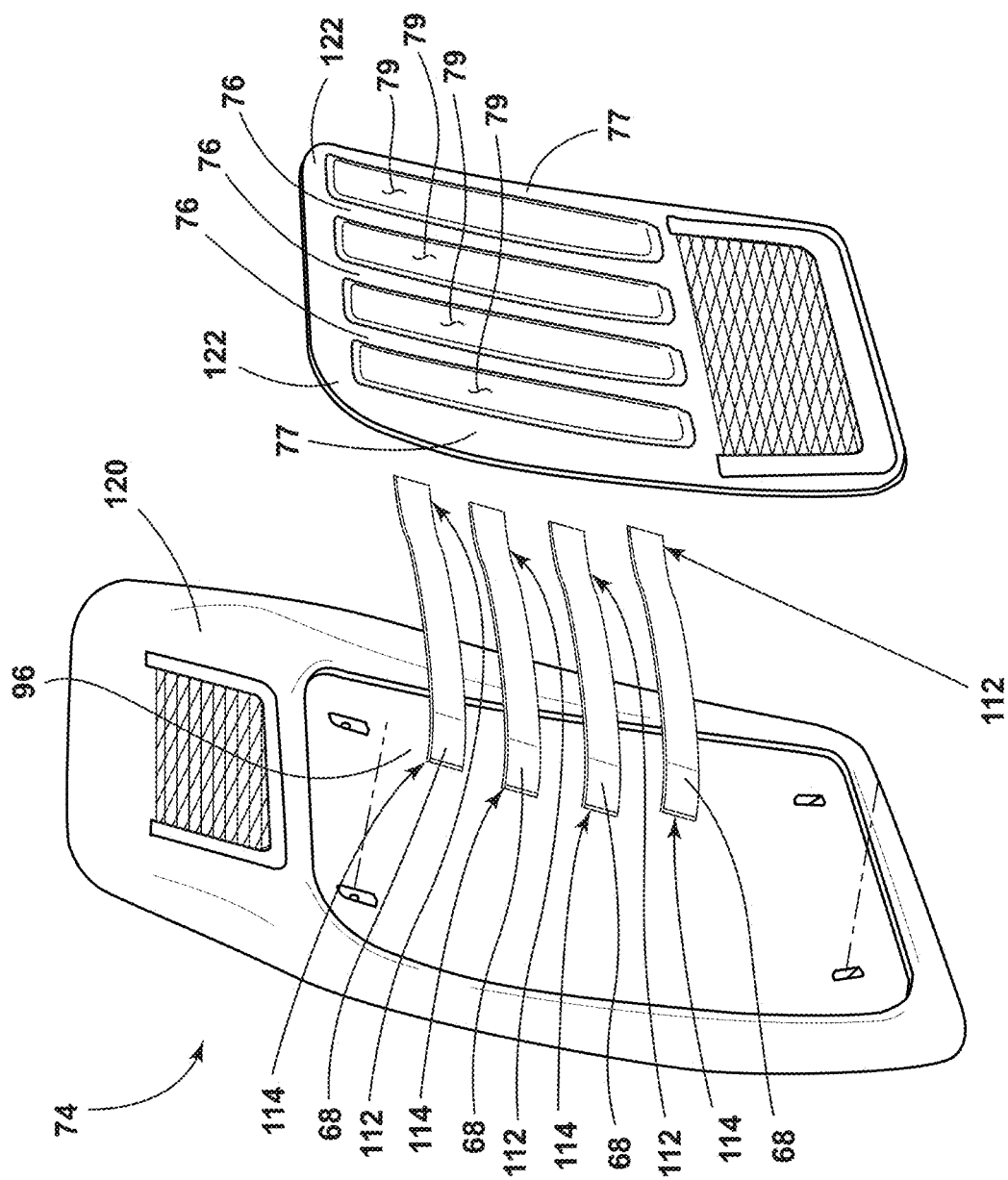
FIG. 4B is an exploded view of the panel of the seatback of FIG. 3 including a first part, straps, and a second part.

Referring again to FIGS. 4A and 7-9, in various embodiments, cross members 76 and outer members 77 cover the attachment areas 112 and 114, respectively, that are the locations of heat stakes, pins, stitches, or other attachments of the elongated members 68 to the base 96. The attachments (e.g., heat stakes, pins, stitches) may be made from the backside 75 of the panel 74 so that the attachments (e.g., heat stakes, pins, stitches) are beneath cross members 76 when the panel 74 is a single molded polymer piece. Alternatively, with reference to FIG. 4B, the panel 74 could have a two-part construction wherein the base 96 is part of a first part 120 of the panel 74, and the cross members 76 and outer members 77 are part of a second part 122 of the panel 74. Referring to FIGS. 4B and 8, the elongated members 68 could be attached to the base 96 of first part 120 with attachments (e.g., heat stakes, pins, stitches) at attachment areas 112, 114. Thereafter, the second part 122 could be attached to the first part 120 by snap fitting, press fitting, or otherwise affixing the second part 122 to the first part 120. In another embodiment, the elongated members 68 could be attached to the second part 122 of the panel 74 proximate cross members 76 and outer members 77 with attachments (e.g., heat stakes, pins, stitches) at attachment areas 112, 114.

In various embodiments of the disclosure, the straps 68 may be made of canvas and may be pinned to base 96 at attachment areas 112 and 114. In various embodiments, panel 74 may be made of seat trim or a seating substrate, and straps 68 may be made of canvas and may be sewn to the seat trim or the seating substrate at attachment areas 112 and 114.

Figure 6:
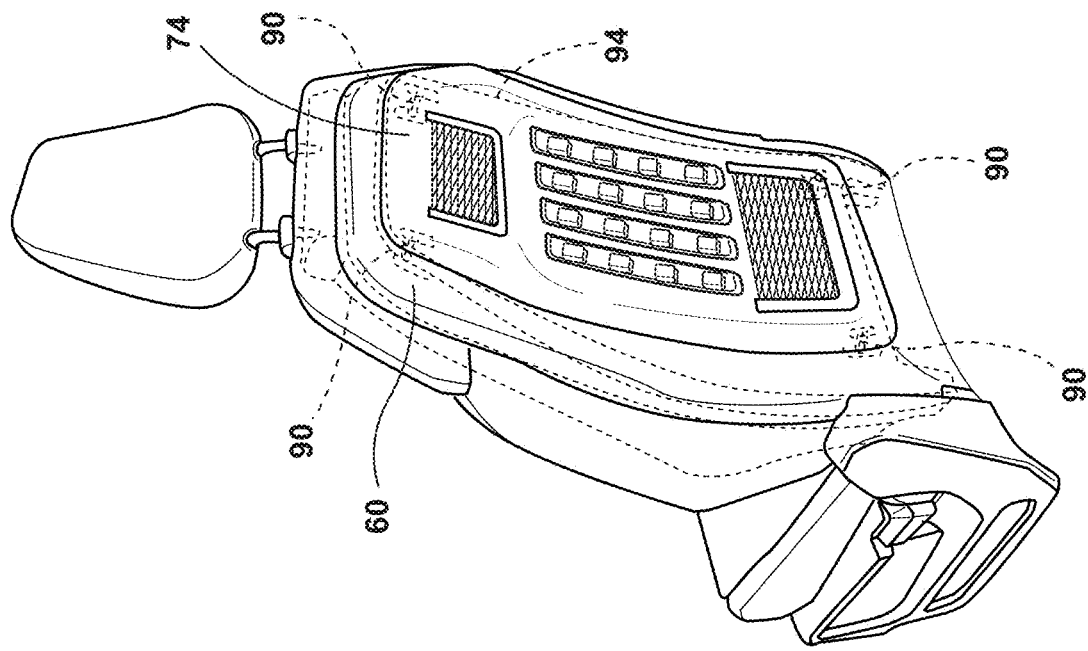
FIG. 6 is a back perspective view of the seatback of FIG. 3 with the panel attached to a seat frame.
Figure 5:
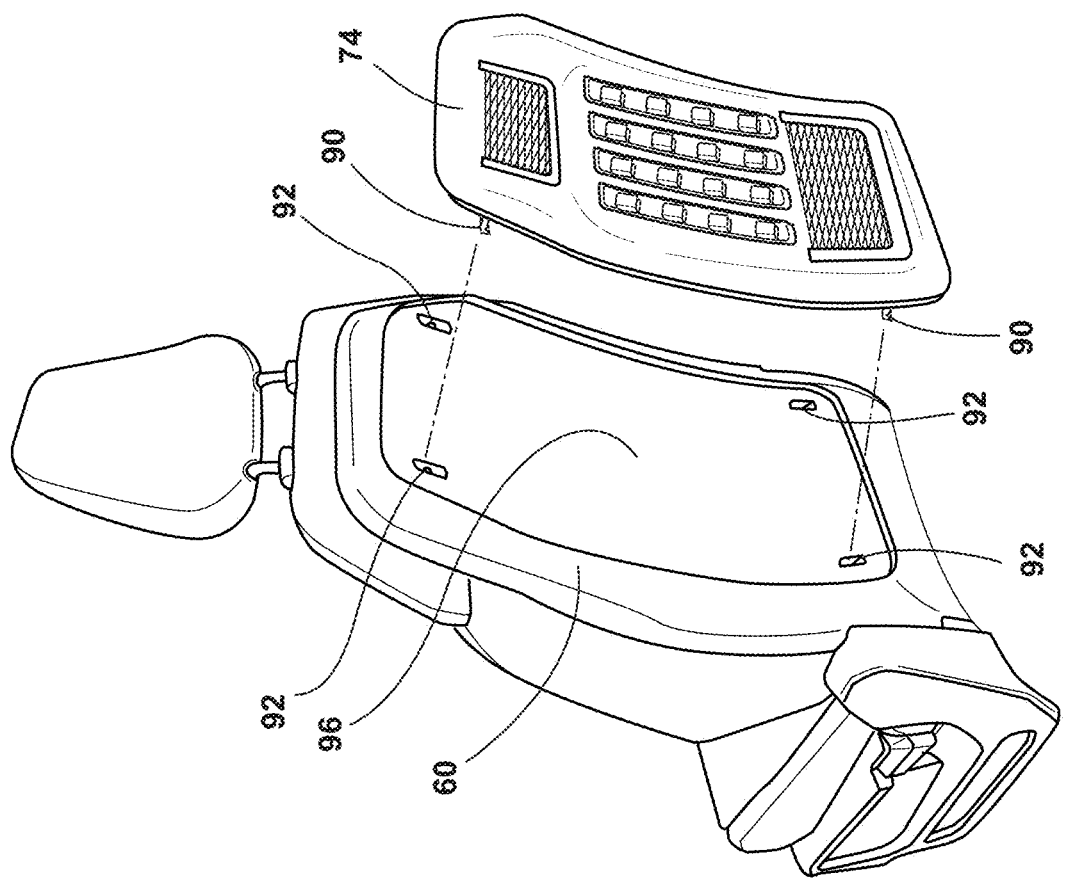
FIG. 5 is a back perspective view of the seatback of FIG. 3 with the panel detached.
Figure 7:
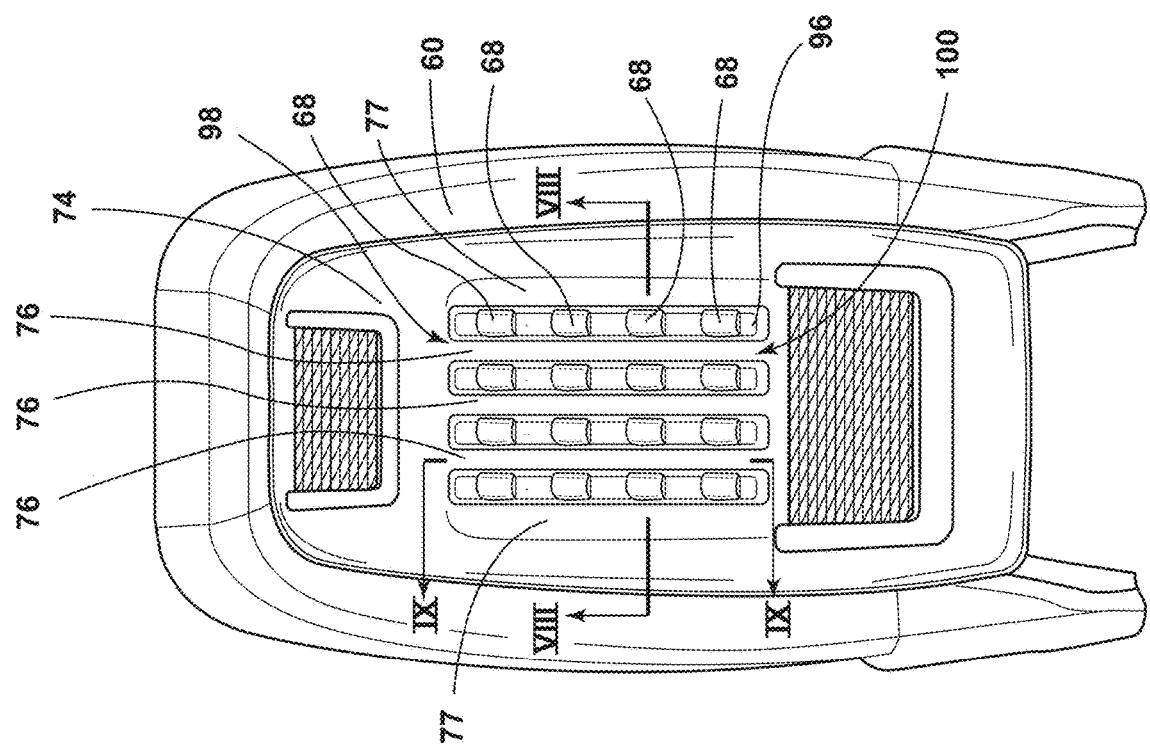
FIG. 7 is a back elevational view of the seatback of FIG. 3.

With reference to FIG. 5, in another embodiment, the panel 74 may be removed from the seatback 60. Panel 74 is attached to the seatback 60 with clips 90 located on the rear side of the panel 74 that are inserted into recesses 92 in the seatback 60. In various embodiments, the panel 74 is an interchangeable modular component of the seatback 60. In various embodiments, a variety of different panels 74 are available for placement on the seatback 60 both during and after the manufacturing process. In various embodiments, a variety of different panels 74 may be interchangeably mounted to the seatback 60 by the vehicle owner after purchase of the vehicle. Referring to FIG. 6, in various other embodiments, the panel 74 is permanently fixed to a seat frame 94 and is not interchangeable.

Figure 10:
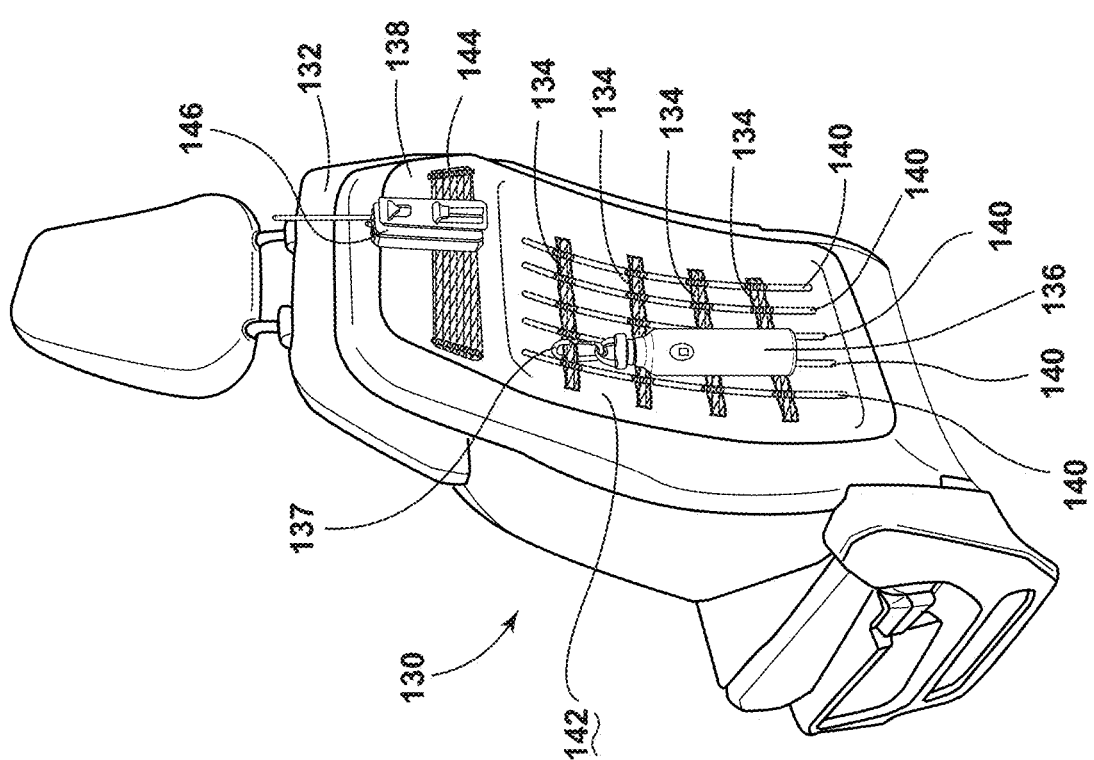
FIG. 10 is a back perspective view of a seatback with substantially horizontal elongated members for retaining passenger items, according to another embodiment.

Referring to FIG. 10, another embodiment of a seating assembly 130 is shown having a seatback 132 with a panel 138 that includes elongated members 134 for supporting passenger items (e.g., carrabeaner 137 with water bottle 136). The elongated members 134 are attached to vertical cross members 140. In one example, the elongated members 134 may be nylon straps that are heat staked to the panel 138 and the cross members 140. A retainer net 144 is shown on the panel 138. The retainer net 144 supports a passenger item (e.g., walkie talkie 146). In various embodiments, the panel 138 may be a modular part that is removable from the seatback 132.

Figure 11:
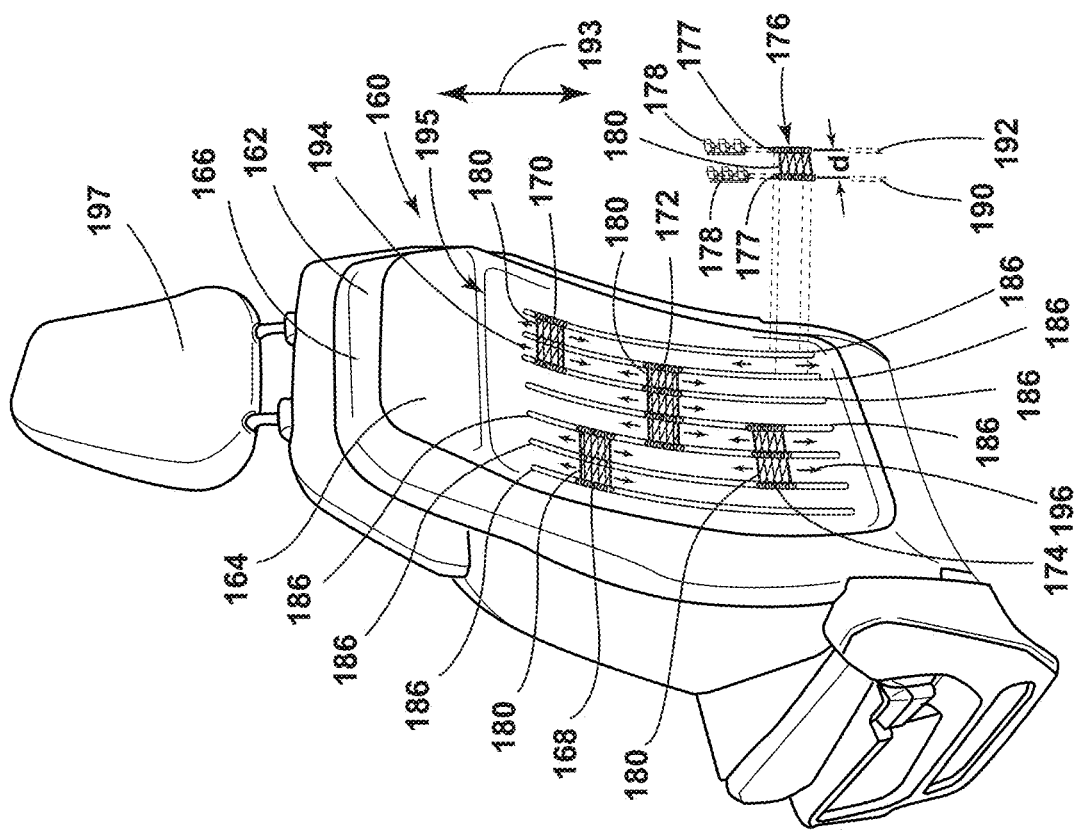
FIG. 11 is a back perspective view of a seatback with straps for retaining passenger items in a first position, according to another embodiment.
Figure 12:
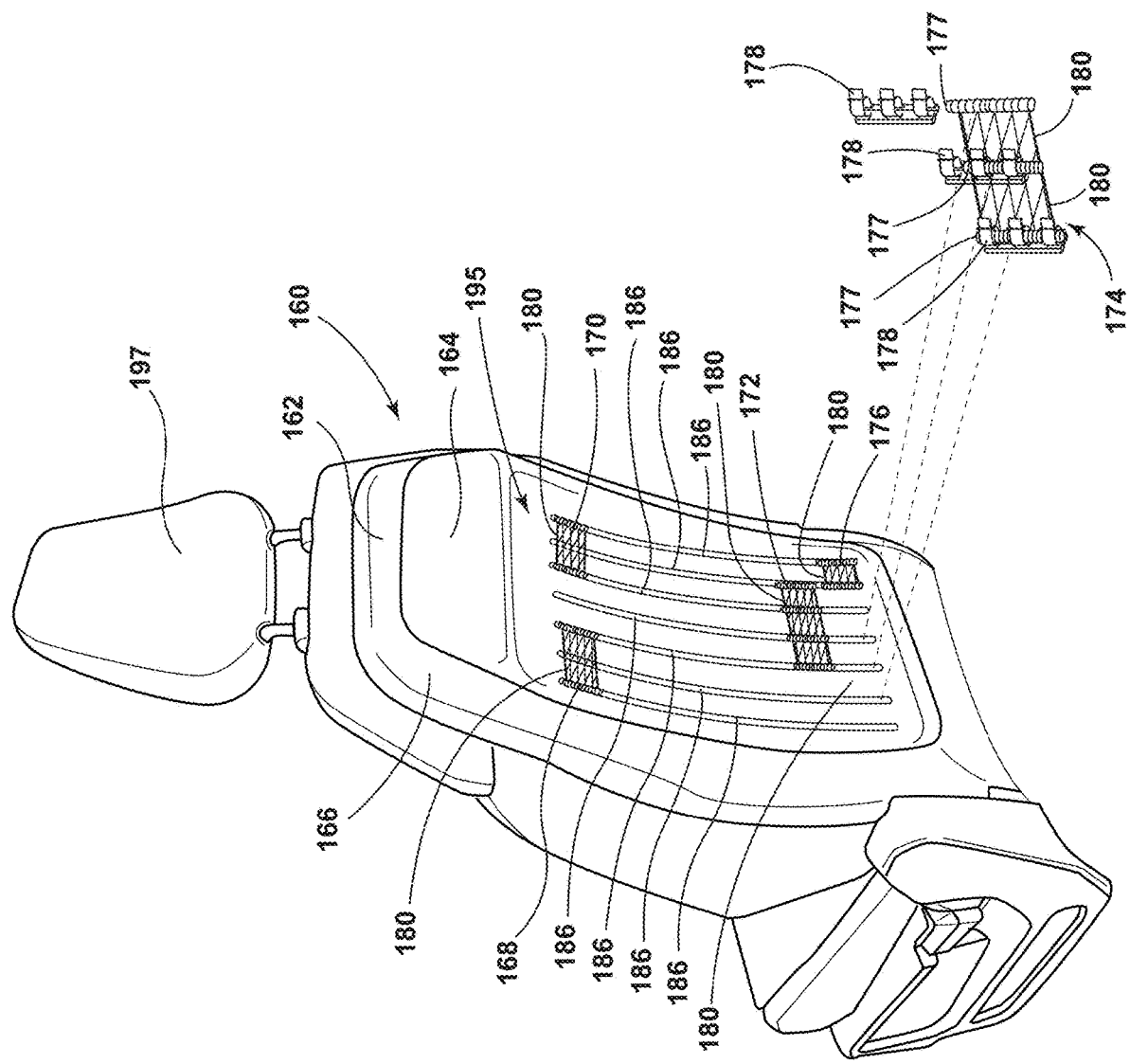
FIG. 12 is a back perspective view of the seatback of FIG. 11 with the straps for retaining passenger items in a second position.

Referring to FIGS. 11-12, another embodiment of a vehicle seating assembly 160 is shown having a seatback 162. A panel 164 is fixedly coupled to a rearward facing portion 166 of the seatback 162. The panel 164 includes straps 168, 170, 172, 174, 176 that form one or more loops 180 for supporting passenger items. Straps 168, 170, 172, 174, and 176 are formed into loops 180 when strap material 177 is placed within spring clips 178 and when spring clips 178 are mounted within channels 186 in the panel 164. With reference to strap 174 of FIG. 12, three areas of strap material 177 are retained within three spring clips 178 to form two loops 180. Spring clips 178 are inserted into the channels 186. In various embodiments, the spring clips 178 may be sew-in spring clips. Straps 168, 170, 172, 174, and 176 are vertically selectively movable along channels 186 when pressure exerted by the spring clips 178 onto the interiors of channels 186 is released. To position a spring clip 178 at a predetermined location along a channel 186, pressure from the spring clip 178 is exerted onto the interior of the channel 186.

Strap 168 is configured with two loops 180. Strap 170 is configured with two loops 180. Strap 172 is configured with three loops 180. Strap 176 is configured with one loop 180. Referring to FIG. 11, strap 176 includes strap material 177 within spring clips 178. Spring clips 178 are slidably fixed within a first channel 190 and a second channel 192, respectively. In various aspects, the distance d between the first and second channels 190, 192 is approximately 20 mm to approximately 30 mm.

Referring again to FIG. 11, arrows 194 depict selectively activable upward sliding of the straps 168, 170, 172, 174, and 176 towards the headrest 197 of seating assembly 160. Arrows 196 depict selectively activable downward sliding of the straps 168, 170, 172, 174, and 176 away from the headrest 197 of seating assembly 160. The straps 168, 170, 172, 174, and 176 may be selectively positioned at various predetermined locations in the channels 186 of the seatback 162. In various embodiments, the channels 186 may be formed by rods, pins, or other elongated members.

FIG. 11 shows the straps 168, 170, 172, 174, 176 in exemplary first positions. FIG. 12 shows the straps 168, 170, 172, 174, 176 in exemplary second positions. Straps 168, 170, 172, 174, 176 are arrangeable in a plurality of positions and configurations along channels 186 as shown in FIGS. 11 and 12. A vehicle occupant may customize the seatback storage area 195 to meet his or her individual storage needs.

Figures 13, 14:
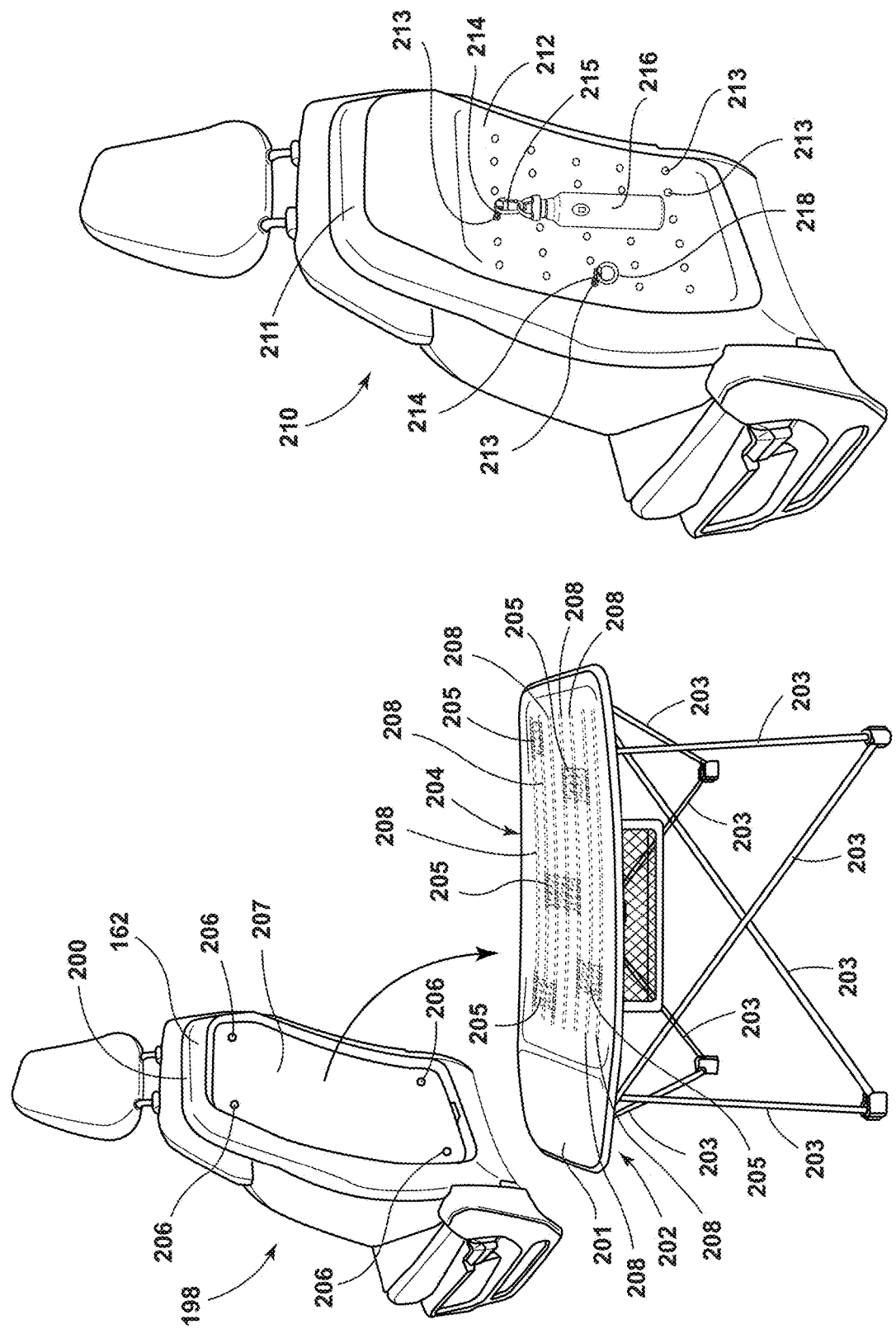
FIG. 13 is a back perspective view of a seatback with a panel with selectively positionable straps that is detached to form a table, according to another embodiment.
FIG. 14 is a back perspective view of a seatback with a peg and hole arrangement for retaining passenger items, according to another embodiment.

Referring to FIG. 13, in an embodiment, a seating assembly 198 includes a seatback 200 and a panel 201 that is selectively detachable from the seatback 200. The panel 201 may be detached from seatback 200 and set up as a separate table 202, as shown. The table 202 may have collapsible, foldable legs 203. The table legs 203 are collapsed when the table 202 is affixed to the seatback 200. Indentation 207 in seatback 200 receives table 202. Table 202 may be snapped onto seatback 200 by inserting snaps on the underside of the table into holes 206. In various embodiments, the panel 201 may include a seatback storage area 204 with selectively positionable straps 205 that are selectively arrangeable along substantially parallel members 208 in a variety of configurations.

Referring to FIG. 14, a seating assembly 210 with seatback 211 is shown with a panel 212 with holes 213 for receiving pegs 214 for hanging passenger items. In one example, a carrabeaner 215 with water bottle 216 is shown hanging on peg 214. A ring 218 is also shown hanging on peg 214. Various fasteners or interference fit parts may be used to secure pegs 214 in holes 213. In various embodiments, the panel 212 is selectively removable from the seatback 211. The panel 212 may be reattached to the seatback 211. A peg 214 may be removed from one hole 213 and placed into a different hole 213. A plurality of pegs 214 may be arranged in holes 213 to form various storage configurations.

Figure 16:
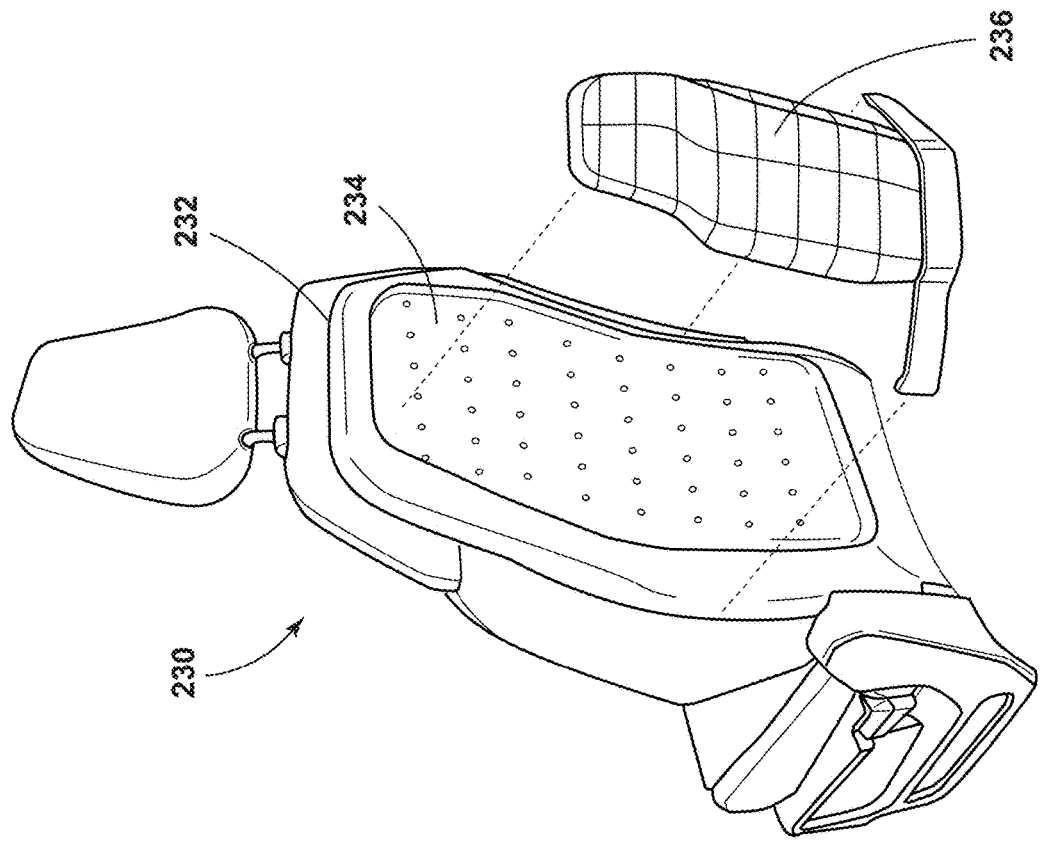
FIG. 16 is a back perspective view of the seatback of FIG. 15 with the backpack detached.
Figure 15:
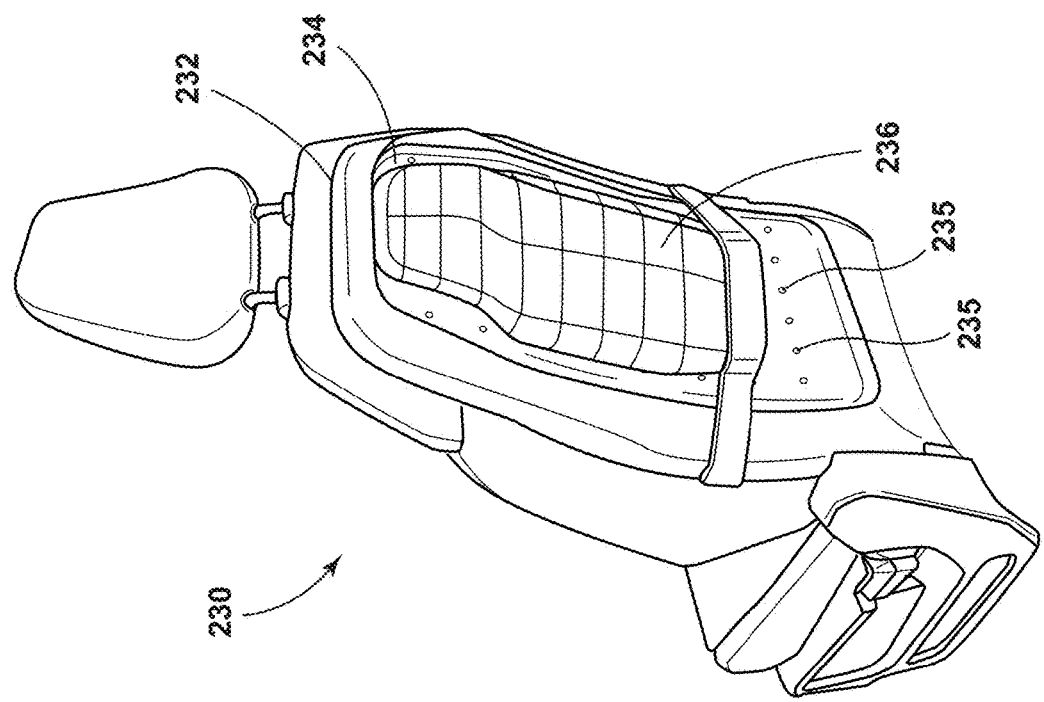
FIG. 15 is a back perspective view of a seatback with a peg and hole arrangement for retaining a backpack, according to another embodiment.
Figure 18:
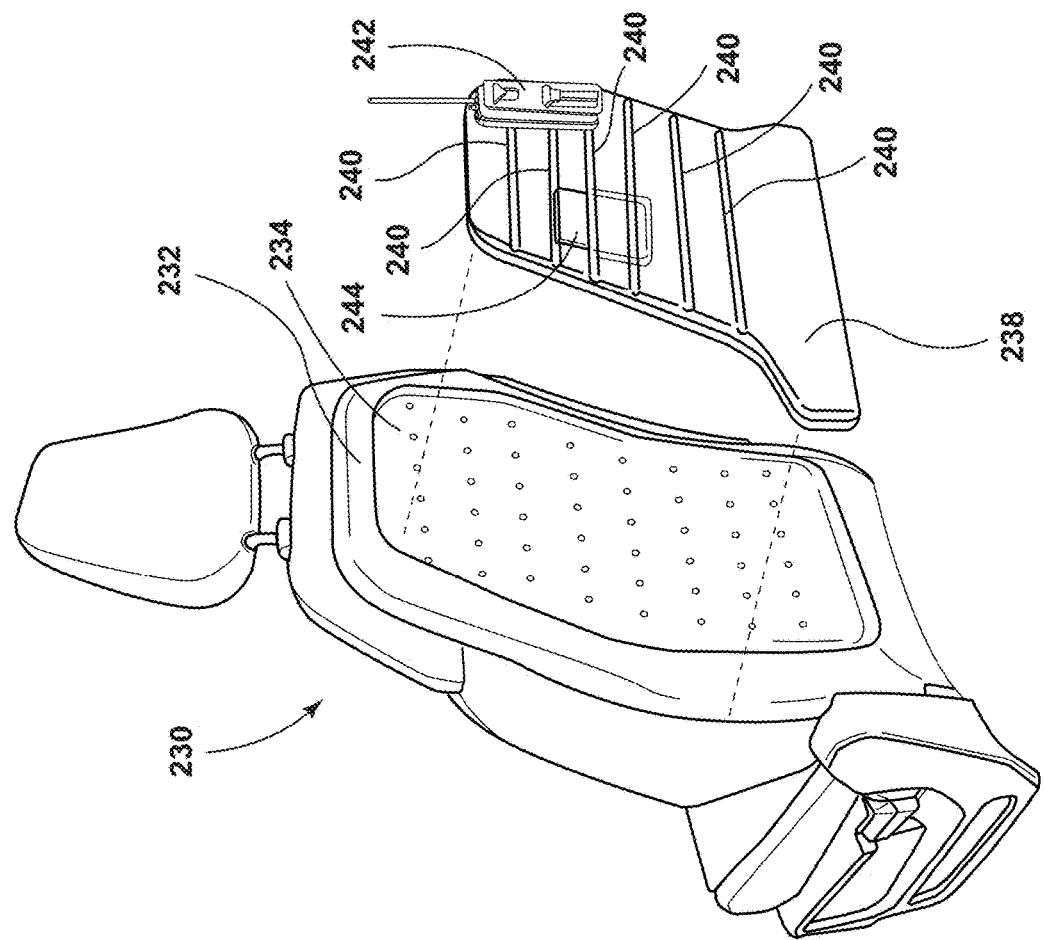
FIG. 18 is a back perspective view of the seatback of FIG. 17 with the storage member detached.
Figure 17:
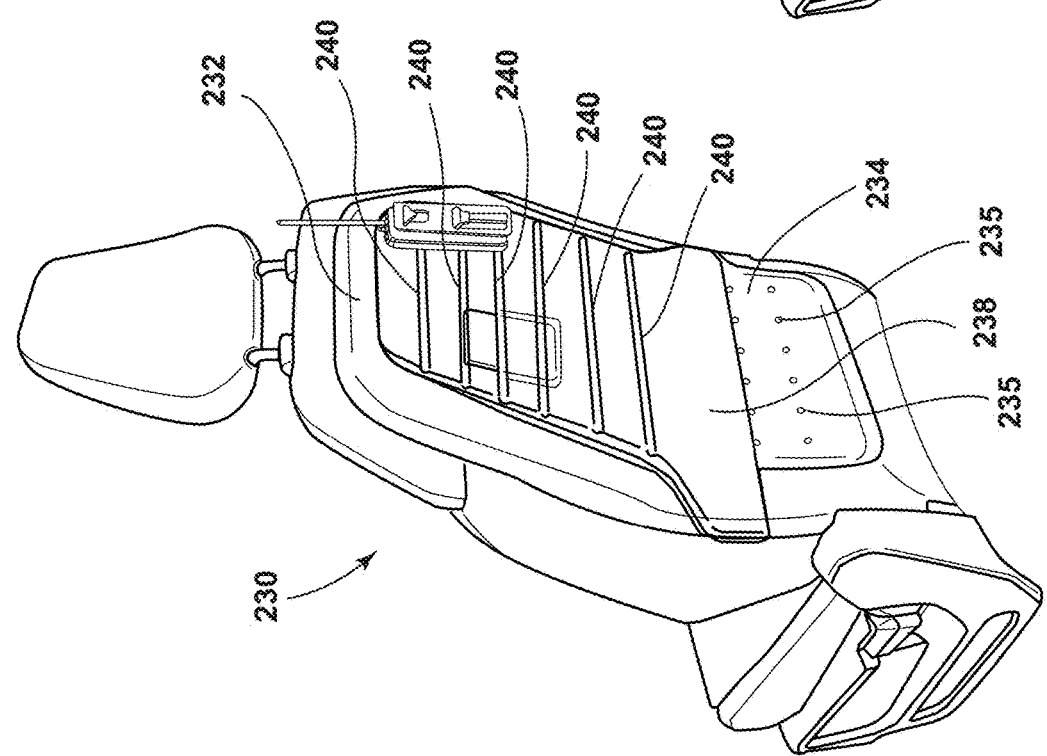
FIG. 17 is a back perspective view of a seatback with a peg and hole arrangement for retaining a storage member, according to another embodiment.

Referring to FIGS. 15-18, a seating assembly 230 includes a seatback 232 with a panel 234 with a selectively detachable backpack 236 (FIGS. 15-16) and a selectively detachable storage member 238 (FIGS. 17-18). Referring specifically to FIGS. 15-16, the backpack 236 may be attached to the panel 234 with one or more pegs that protrude from the back of the backpack 236 and are insertable into one or more holes 235. Referring to FIGS. 17-18, the detachable storage member 238 with pockets 240 is shown. The horizontal pockets 240 hold passenger items such as walkie talkie 242 and booklet 244, for example. The storage member 238 may be attached to the panel 234 with one or more pegs that protrude from the back of the storage member 238 and are insertable into one or more holes 235. With reference to FIGS. 15-18, it may be convenient for a passenger to store items in the vehicle in the backpack 236 or storage member 238 and to detach backpack 236 or storage member 238 from the seatback 232 to transport passenger items outside of the vehicle. Upon return to the vehicle, a passenger may reattach the backpack 236 or storage member 238 to the seatback 232.

Figure 20:
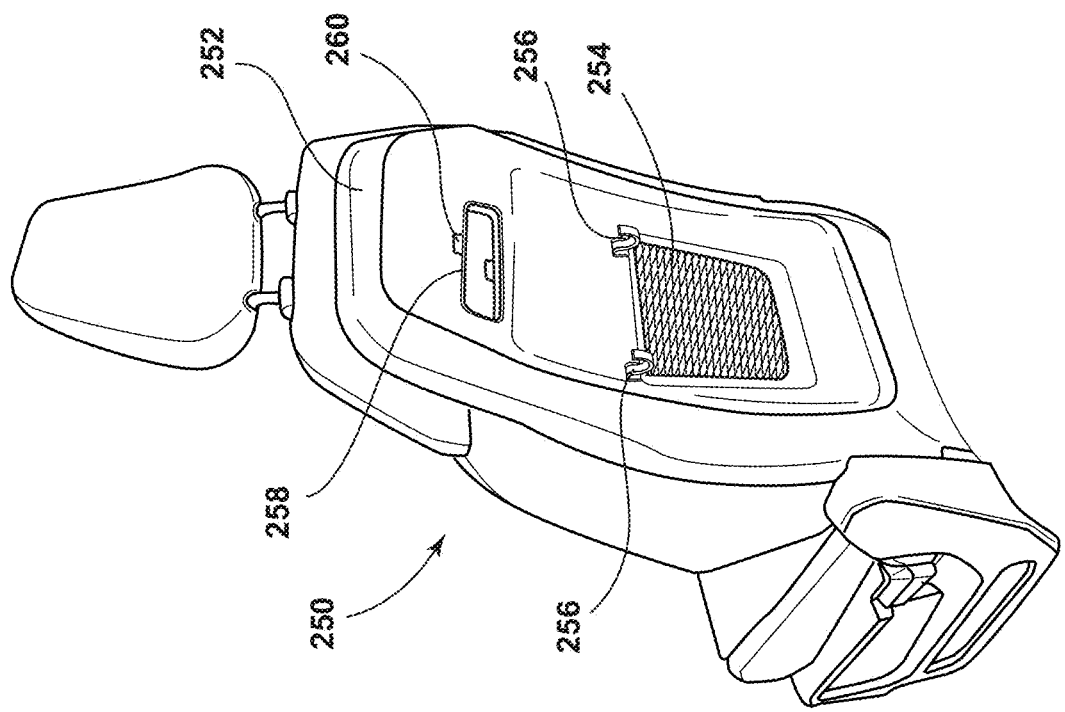
FIG. 20 is a back perspective view of the seatback of FIG. 19 with hooks and with the hanging bag removed.
Figure 19:
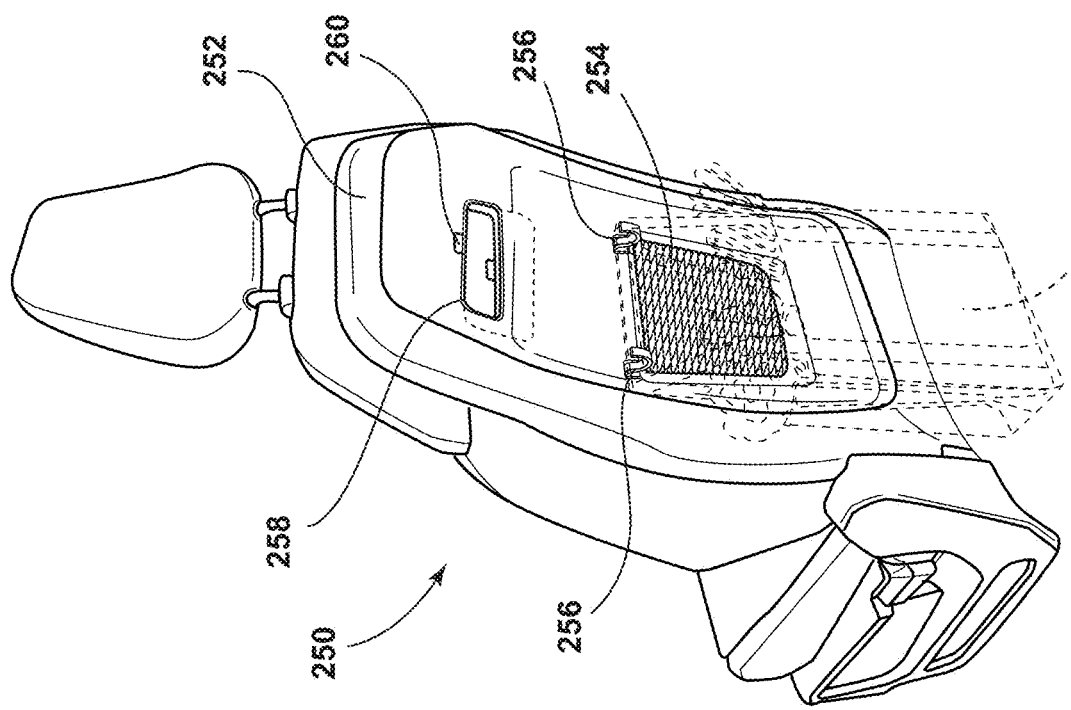
FIG. 19 is a back perspective view of a seatback with hooks and a hanging bag, according to another embodiment.

Referring to FIGS. 19-20, seating assembly 250 includes seatback 252 with a netted storage pocket 254. The netted storage pocket 254 is below rearward extending hooks 256 that are proximate the top corners of the netted storage pocket 254. The hooks 256 are lightweight. Cell phone holder 258 and rear panel release 260 are shown on the seatback 252. Referring to FIG. 19, a shopping bag 257 is shown hanging on the hooks 256.

Figure 21:
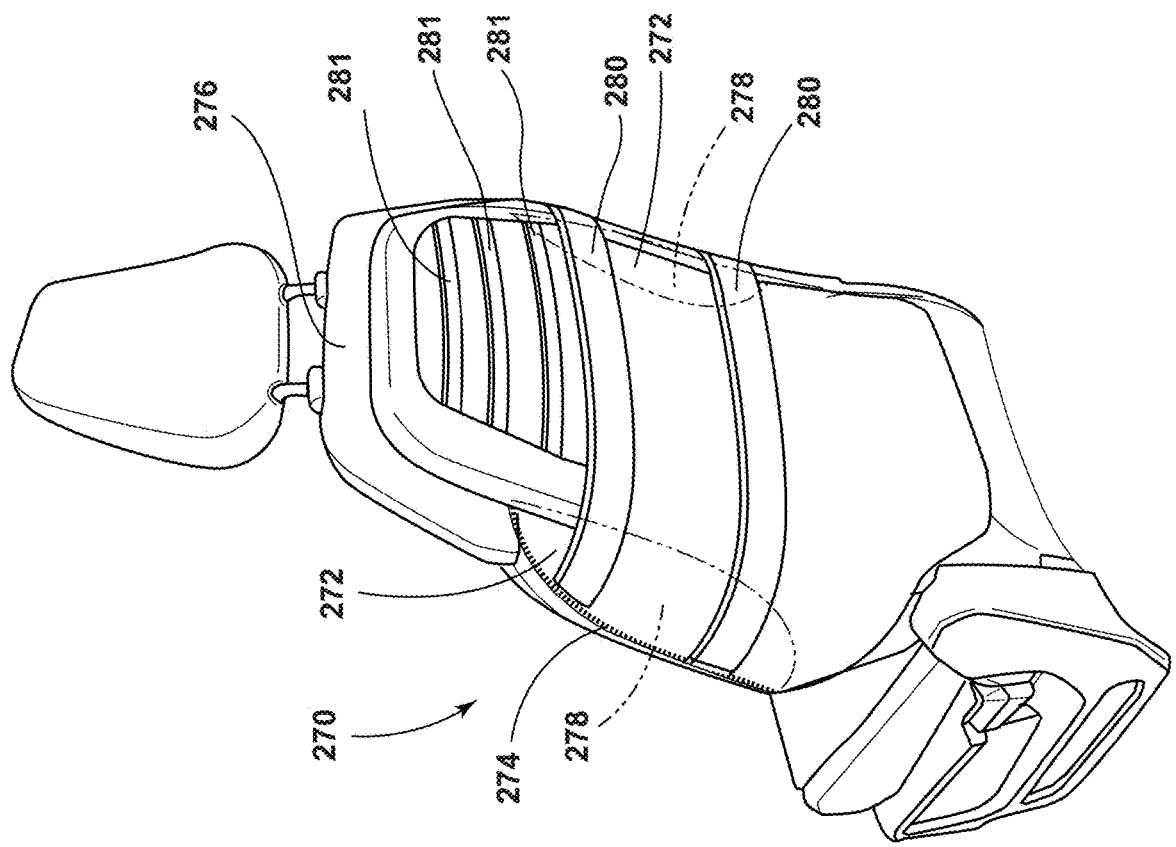
FIG. 21 is a back perspective view of a seatback with pockets in the bolster area and on the rear portion for retaining passenger items, according to another embodiment.

Referring to FIG. 21, a seating assembly 270 includes seatback 276 having pockets 272 with zippers 274 on the sides of the seatback 276 in the side bolster areas 278. Pockets 280 and 281 are on the rear portion of seatback 276. Zippers 274 provide access to pockets 272.

Figure 22:
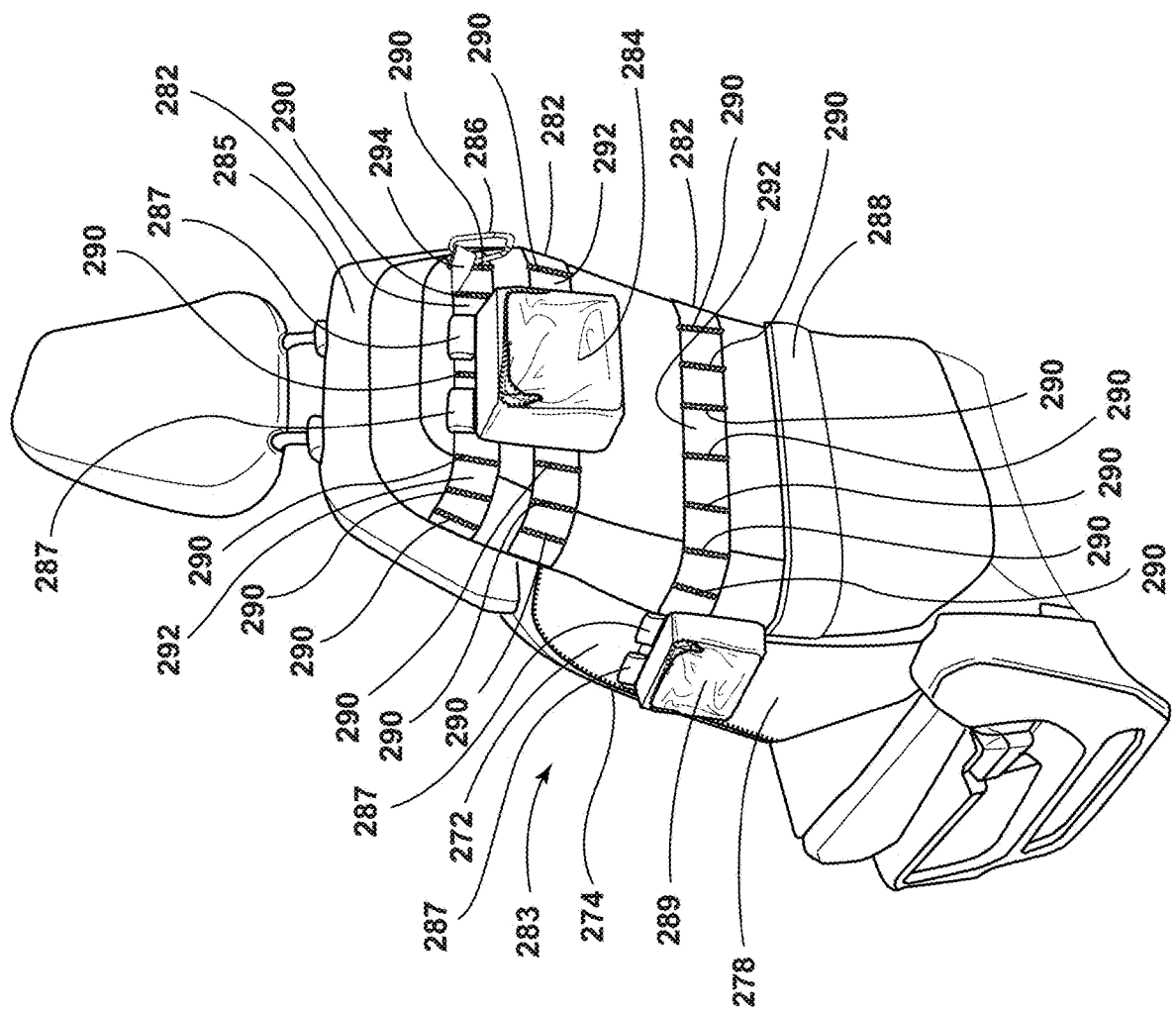
FIG. 22 is a back perspective view of a seatback with pockets in the bolster area and on the rear portion for retaining passenger items with the zipper of the bolster area pocket closed, according to another embodiment.
Figure 23:
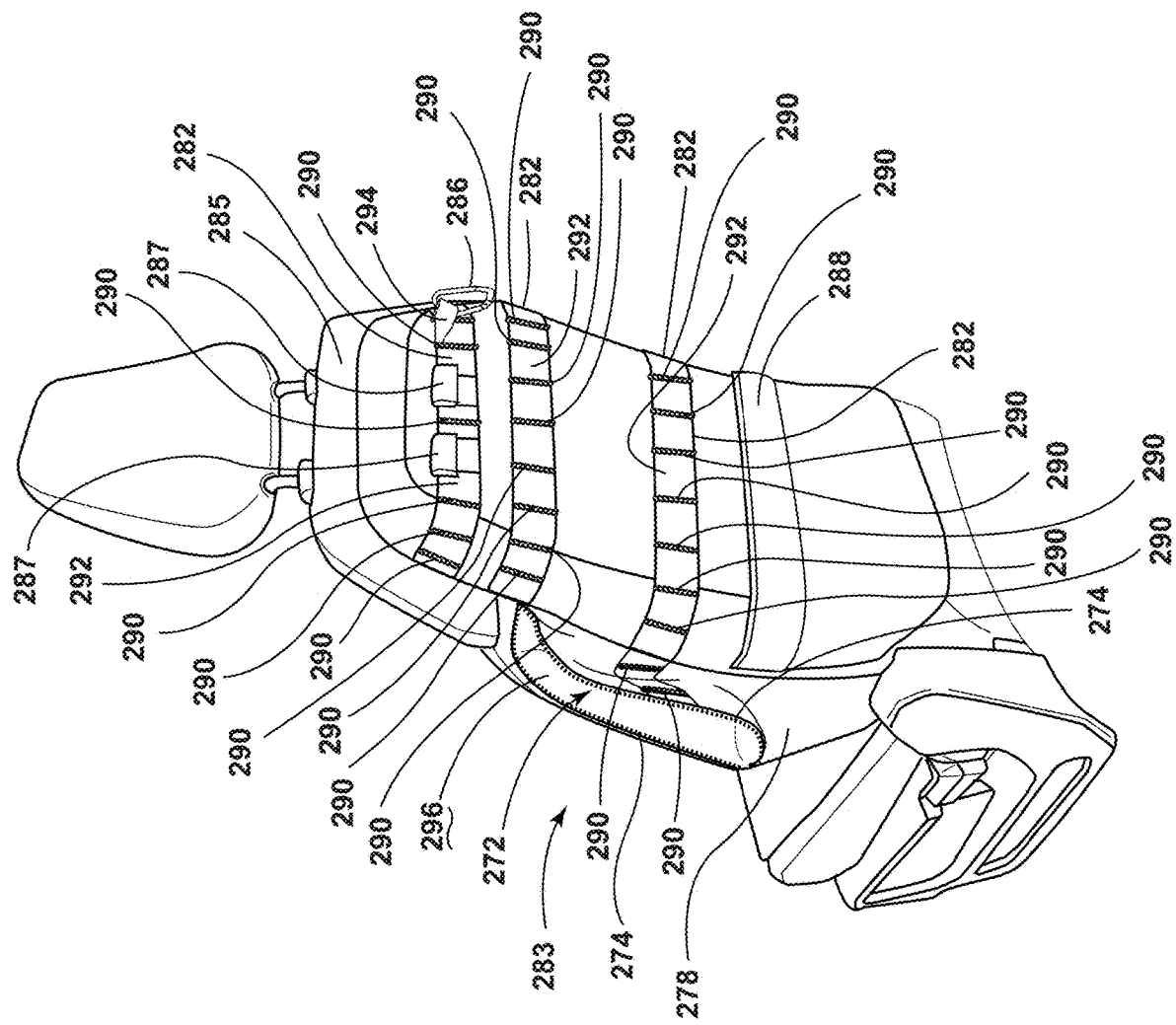
FIG. 23 is a back perspective view of the seatback of FIG. 22 with the zipper of the bolster area pocket open.

With reference to FIGS. 22-23, seating assembly 283 includes seatback 285 with straps 282 securing passenger items to the seatback 285. A passenger item (pouch 289) hangs on a strap 282 in the side bolster area 278. Bolster area 278 includes pocket 272. Zipper 274 provides a means to open and close pocket 272. Straps 282 and pocket 288 are arranged on seatback 285 to provide a variety of storage options. Straps 282 include attachment areas 290 and loops 292 between attachment areas 290. Straps 282 may also include a closed hanger 294 hanging from the top of a strap 282. In the depicted embodiment, a carrabeaner 286 is shown suspended from the closed hanger 294. In various embodiments, straps 282 may be made of a canvas material and may be sewn to a seatback 285 trim at attachment areas 290. In various embodiments, straps 282 may have some elasticity.

Referring to FIG. 22, pouch 289 hangs from clips 287 on straps 282 in bolster area 278. Pouch 284 hangs from clips 287 on strap 282 on the seatback 285. Referring to FIG. 23, clips 287 are present on seatback 285. Clips 287 may be used to attach pouches or other items to seatback 285.

Figure 24:
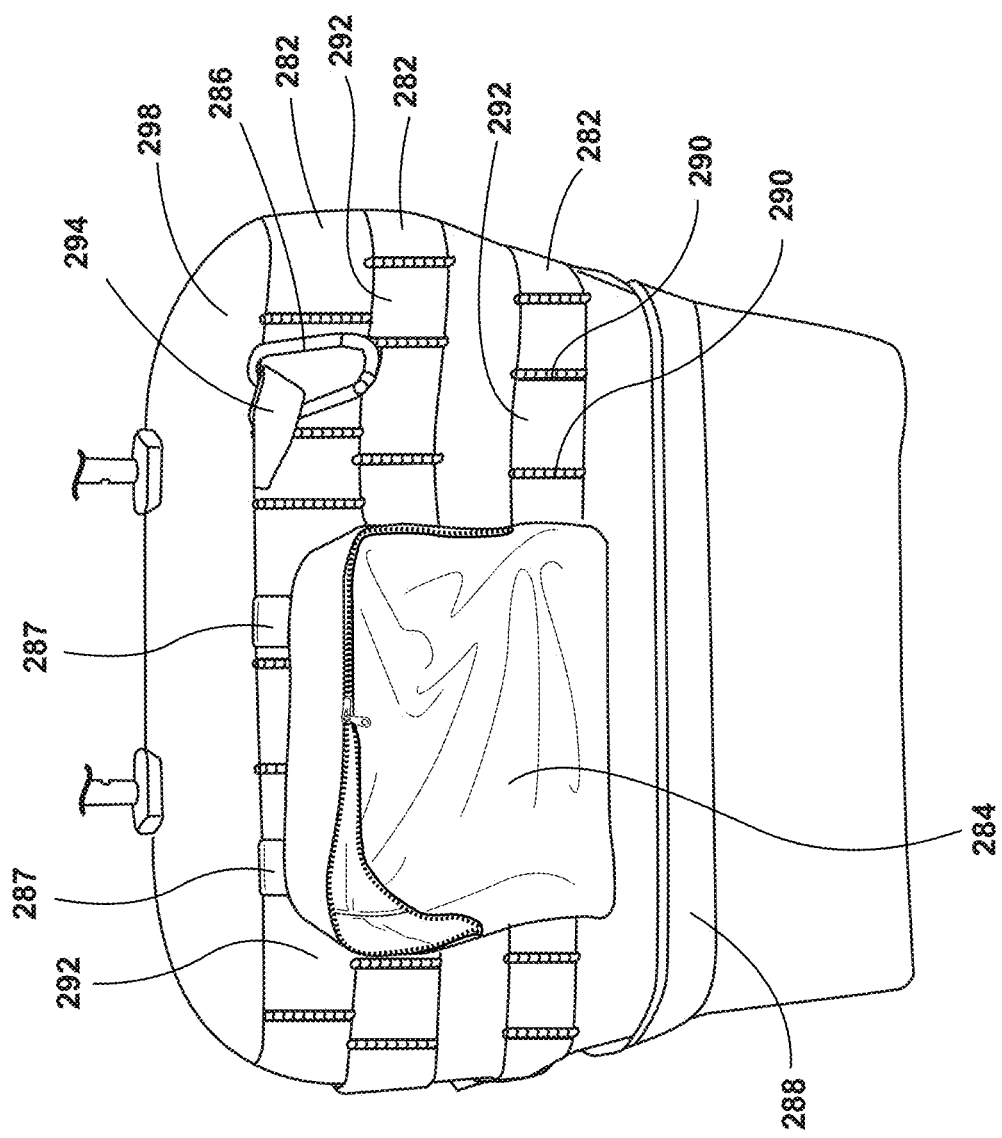
FIG. 24 is a back elevational view of a seatback with straps and a pocket for retaining passenger items, according to another embodiment.

Referring to FIG. 24, seatback 298 includes straps 282 and pocket 288. Straps 282 include loops 292 and attachment areas 290. Clips 287 suspend pouch 284 from strap 282. Closed hanger 294 is attached to strap 282 and retains carrabeaner 286.

Figure 26:
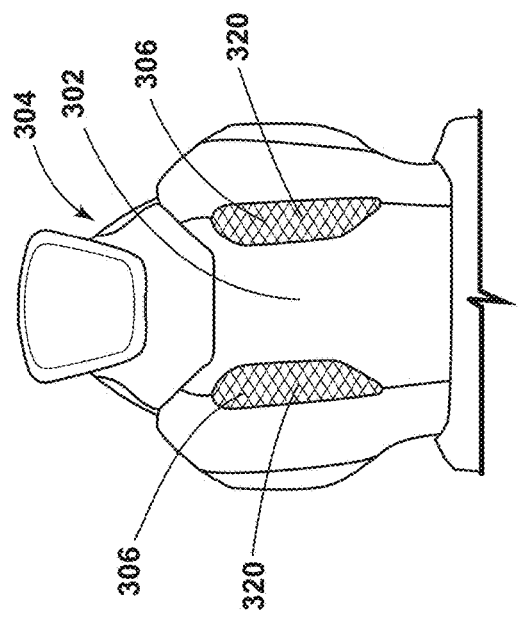
FIG. 26 is a front elevational view of a seatback of the seating assembly of FIG. 25.
Figure 27:
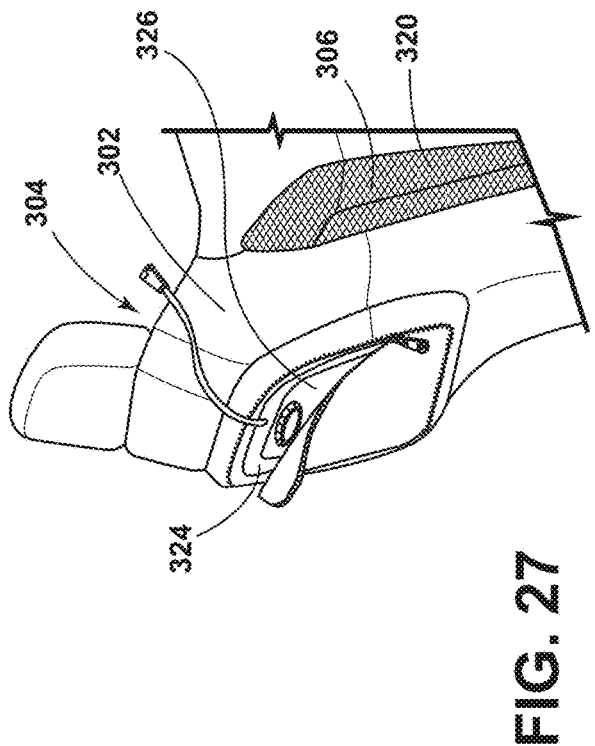
FIG. 27 is a partial backside perspective view of a seatback with a mesh-covered opening and a pocket, according to another embodiment.
Figure 25:
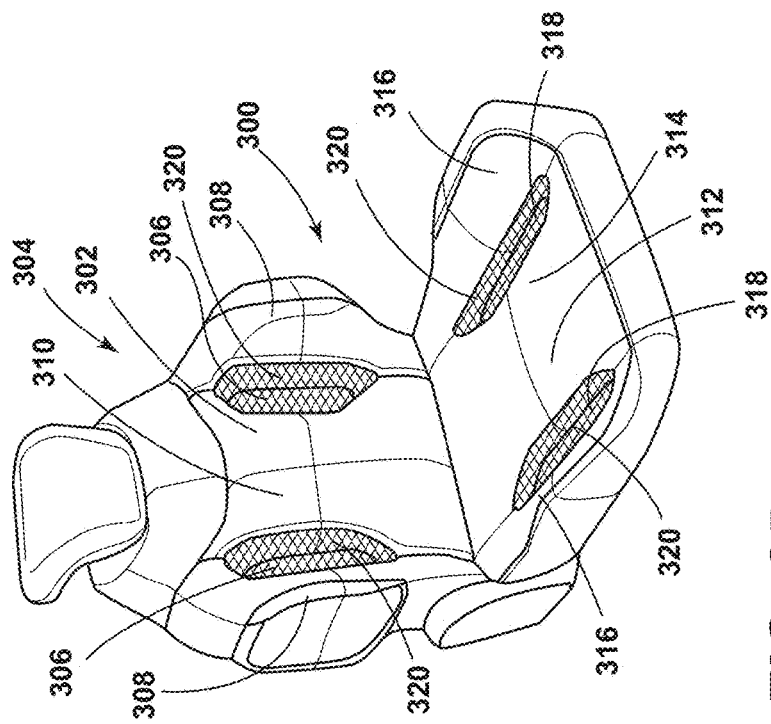
FIG. 25 is a front perspective view of a seating assembly with mesh-covered openings, according to another embodiment.

Referring to FIGS. 25-27, seating assembly 300 includes a seatback 302 with a tapered upper area 304 for improved visibility. The seating assembly 300 includes openings 306 between the seatback bolsters 308 and the seatback middle 310. The seat 312 of seating assembly 300 includes a seat middle 314 with seat bolsters 316. Openings 318 are between the seat middle 314 and the seat bolsters 316. Openings 306, 318 may be covered with a mesh 320 or other breathable fabric. The mesh 320 covered openings 306, 318, allow for airflow between seatback middle 310 and seatback bolsters 308 and seat middle 314 and seat bolsters 316, respectively. The openings 306 and 318 make the seating assembly 300 lighter than what it would be without the openings 306 and 318. The mesh 320 also provides a pleasing appearance at openings 306 and 318. Referring to FIG. 27, the seatback 302 may include storage space such as a pocket 324 for storing a hydration pack (CamelBak®) 326.

Figure 28:
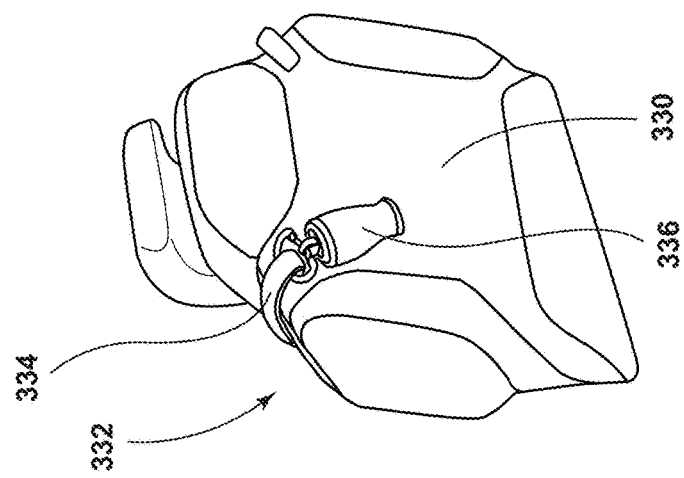
FIG. 28 is a back perspective view of a seatback with a strap for retaining a passenger item, according to another embodiment.

Referring to FIG. 28, a seatback 330 includes a tapered top area 332. In various embodiments, the seatback 330 includes a shoulder strap 334 for retaining passenger items such as water bottle 336.

Figure 29:
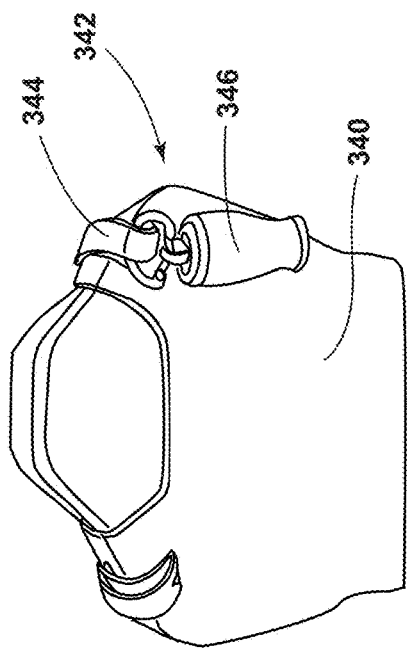
FIG. 29 is a back elevational view of a seatback with a strap for retaining a passenger item, according to another embodiment.

Referring to FIG. 29, a seatback 340 includes a tapered top area 342. The seatback 340 includes a shoulder strap 344 for retaining passenger items such as water bottle 346.

Figure 30:
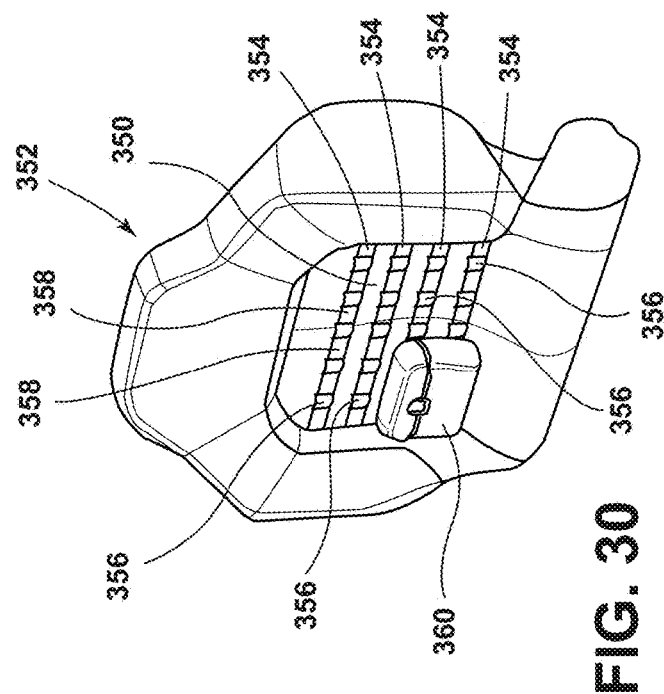
FIG. 30 is a back perspective view of a seatback with straps for retaining passenger items, according to another embodiment.

With regard to FIG. 30, seatback 350 includes tapered top area 352. Seatback 350 has elongated straps 354 arranged across the rear portion of seatback 350. The elongated straps 354 include loops 356 and attachment areas 358. A container 360 is attached to straps 354.

Referring to FIGS. 31 and 32, the seating assembly 370 includes a seat assembly 372 and a seatback assembly 374 that includes a shell 376 and a liner 378. The seatback assembly 374 includes a shell 380 and a liner 382. The seatback assembly 374 is coupled to the seat assembly 372 at coupling 386. In various embodiments, the seatback assembly 374 is rotationally coupled to the seat assembly 372 at coupling 386. The seating assembly 370 is coupled to the floor 392 at supports 390.

In various embodiments of the disclosure, some seatbacks include panels that are selectively removable and replaceable with one or more different panels. Selective removal and replacement of the panels may occur after the user purchases the vehicle. Panels may be removed and replaced to change functional aspects and/or appearance of the seatback.

In various embodiments of the disclosure, the seatback storage areas may be arranged with elongated members or straps in horizontal directions and cross members in vertical directions. Similarly, the seating assembly areas may be rearranged so that the elongated members or straps are in a vertical direction and the cross members are in a horizontal direction. Additionally, the elongated members or straps and the cross members may be arranged diagonally across a seatback. For example, for a rectangular-shaped seatback, the elongated members or straps could be arranged diagonally from the top left corner to the bottom right corner, and the cross members could be arranged diagonally from the top right corner to the bottom left corner.

In various embodiments of the disclosure, storage areas may be arranged on seatbacks in various locations in a vehicle (e.g., seatbacks on a third row of vehicle seats or seatbacks that abut a trunk area in a wagon type vehicle).

A variety of advantages may be derived from the use of the present disclosure. A passenger is able to store passenger items in visible, accessible areas on vehicle seatbacks. The seatback storage areas accommodate various types and sizes of passenger items. Passenger items stored on the seatbacks remain clean because they are not placed on the floor, where they might be stored if seatback storage were not available. Also, children sitting in the rear seats of the vehicle are able to store and access a variety of books, toys, and snacks that may be stored in the seatback storage areas. The seatback storage areas provide efficient use of space within the vehicle. Some seatback storage areas allow for customized configuration of storage spaces. Seatback panels may be removed and replaced. While the panels are removed from the seatbacks, they could be cleaned or used for other purposes (for example, as tables). Further, the panels may be fabricated as modular parts and installed in existing seating assembly production facilities. Also, the seatbacks and panels may be designed to allow for installation of interchangeable panels for various functions of the seatback throughout a vehicle life.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seatback for a vehicle seating assembly comprising:
a rear portion defining a panel mounting surface;
a seat frame;
a panel selectively removable from a seat frame and having an aperture;
a storage container extending from the aperture and toward the seat frame; and
a panel release disposed adjacent to the aperture and configured to detach the panel from the panel mounting surface upon exertion of a force on the panel release, wherein the panel release in the locked position allows the aperture to function as a device holder.

2. The seatback for a vehicle seating assembly of claim 1, further comprising:
snaps disposed on the panel; and
holes disposed in the panel mounting surface, wherein the snaps are selectively engageable with the holes to attach the panel to the panel mounting surface, and wherein the snaps are selectively disengageable from the holes to detach the panel from the panel mounting surface.

3. The seatback for a vehicle seating assembly of claim 2, wherein the storage container extends below the aperture.

4. The seatback for a vehicle seating assembly of claim 3, wherein the aperture has an oblong opening.

5. The seatback for a vehicle seating assembly of claim 4, further comprising:
a pair of opposing hooks disposed on the panel.

6. The seatback for a vehicle seating assembly of claim 5, further comprising:
a pocket disposed between the pair of opposing hooks.

7. The seatback for a vehicle seating assembly of claim 6, further comprising:
a net defining an outer surface of the pocket.

8. The seatback for a vehicle seating assembly of claim 1, further comprising:
clips disposed on the panel; and
recesses disposed in the panel mounting surface, wherein the clips are selectively engageable with the recesses to attach the panel to the panel mounting surface, and wherein the clips are selectively disengageable from the recesses to detach the panel from the panel mounting surface.

9. The seatback for a vehicle seating assembly of claim 1, further comprising:
a hook disposed on the panel.

10. The seatback for a vehicle seating assembly of claim 9, further comprising:
a storage pocket disposed on the panel.

11. A vehicle seatback comprising:
a longitudinal bolster integrated into and disposed along a side of the seatback;
a laterally disposed pocket extending across the longitudinal bolster; and
a longitudinally disposed pocket extending along the longitudinal bolster and in an overlapping arrangement with the laterally disposed pocket.

12. The vehicle seatback of claim 11, wherein the overlapping arrangement includes the laterally disposed pocket on the outside of the longitudinally disposed pocket.

13. The vehicle seatback of claim 12, further comprising:
a zipper extending along the longitudinally disposed pocket.

14. The vehicle seatback of claim 13, wherein the laterally disposed pocket includes an end adjacent to the zipper.

15. The vehicle seatback of claim 13, wherein the longitudinal bolster includes a pair of opposing longitudinal bolsters disposed on opposing sides of the seatback, wherein the laterally disposed pocket includes a pair of laterally disposed pockets in an overlapping arrangement with the pair of opposing longitudinal bolsters.

16. The vehicle seatback of claim 15, further comprising:
a headrest extending from the seatback; and
one or more additional laterally extending pockets disposed between the pair of laterally disposed pockets and the headrest.

17. A vehicle seating assembly comprising:
a seat including:
a seat middle;
a seat bolster; and
a seat opening defined by a seat passageway between the seat middle and the seat bolster, wherein the seat bolster includes a pair of opposing longitudinal bolsters disposed along opposing sides of the middle, and wherein a breathable material extends from the seat middle to each of the pair of opposing longitudinal bolsters, and wherein the seat middle includes a tapered upper area and a pocket;

seatback including:
- a seatback middle,
- a pair of opposing longitudinal seatback bolsters disposed along opposing sides of the seatback middle;
- a pair of seatback openings defined by a pair of seatback passageways disposed between each of the longitudinal seatback bolsters, and the seatback middle; and
- a breathable material extending from the seatback middle to each of the pair of opposing seatback bolsters.

* * * * *

UNITED STATES PATENT AND TRADEMARK OFFICE
CERTIFICATE OF CORRECTION

| | |
|---|---|
| PATENT NO. | : 11,485,292 B2 |
| APPLICATION NO. | : 17/223107 |
| DATED | : November 1, 2022 |
| INVENTOR(S) | : Vanderpool et al. |

It is certified that error appears in the above-identified patent and that said Letters Patent is hereby corrected as shown below:

In the Claims

Column 10:
Claim 17, Line 63;
"the middle," should be --the seat middle--.
Claim 17, Line 67;
":" should be --;--.

Column 11:
Claim 17, Line 2;
"," should be --;--.
Claim 17, Line 7;
"bolsters," should be --bolsters--.

Signed and Sealed this
Third Day of January, 2023

Katherine Kelly Vidal
*Director of the United States Patent and Trademark Office*